US012579601B2

(12) United States Patent
Li

(10) Patent No.: US 12,579,601 B2
(45) Date of Patent: Mar. 17, 2026

(54) IMAGE RENDERING OPTIMIZATION METHOD, ELECTRONIC DEVICE, AND STORAGE MEDIUM

(71) Applicant: HONOR DEVICE CO., LTD., Shenzhen (CN)

(72) Inventor: Ying Li, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 210 days.

(21) Appl. No.: 18/276,354

(22) PCT Filed: Aug. 24, 2022

(86) PCT No.: PCT/CN2022/114624
§ 371 (c)(1),
(2) Date: Aug. 8, 2023

(87) PCT Pub. No.: WO2023/124149
PCT Pub. Date: Jul. 6, 2023

(65) Prior Publication Data
US 2024/0112298 A1 Apr. 4, 2024

(30) Foreign Application Priority Data
Dec. 30, 2021 (CN) .......................... 202111681775.6

(51) Int. Cl.
G06T 1/20 (2006.01)
G06T 1/60 (2006.01)
G06T 3/40 (2024.01)
(52) U.S. Cl.
CPC .................. G06T 1/60 (2013.01); G06T 1/20 (2013.01); G06T 3/40 (2013.01)

(58) Field of Classification Search
CPC .... G06T 1/20; G06T 1/60; G06T 3/40; G06T 11/40; G09G 5/363; G09G 5/39;
(Continued)

(56) References Cited

U.S. PATENT DOCUMENTS

2011/0157181 A1 6/2011 Diard et al.
2017/0330496 A1 11/2017 Oravainen
(Continued)

FOREIGN PATENT DOCUMENTS

| CN | 108648259 A | 10/2018 |
| CN | 110152291 A | 8/2019 |
| CN | 113726950 A | 11/2021 |

*Primary Examiner* — Jacinta M Crawford
(74) *Attorney, Agent, or Firm* — WOMBLE BOND DICKINSON (US) LLP

(57) ABSTRACT

This application provides an image processing method, an electronic device, and a storage medium, and relates to the field of image processing. The method includes: receiving a frame buffer resource creation command delivered by an application, where a frame buffer corresponding to the frame buffer resource creation command includes a color attachment; storing, in preset storage space, a frame buffer identifier of a frame buffer whose quantity of color attachments meets a preset quantity condition; receiving a rendering command delivered by the application, where the rendering command corresponds to a first frame buffer; and performing a rendering operation corresponding to the rendering command on a second frame buffer if a frame buffer identifier consistent with a frame buffer identifier of the first frame buffer exists in the preset storage space, where resolution of the second frame buffer is lower than resolution of the first frame buffer.

19 Claims, 13 Drawing Sheets

(58) Field of Classification Search
CPC ........ G09G 5/391; G09G 5/393; G09G 5/395;
G09G 5/397; G09G 5/399; G09G
2350/00
USPC ........................................................ 345/545
See application file for complete search history.

(56) References Cited

U.S. PATENT DOCUMENTS

| | | |
|---|---|---|
| 2018/0182153 A1 | 6/2018 | Potter et al. |
| 2021/0225067 A1 | 7/2021 | Guo |
| 2021/0358192 A1 | 11/2021 | Zhang et al. | bindFrameBuffer (FB2)
glViewport(w1, h1)
glBindTexture(tex_id2)
glDrawElement()

A part of data of the
N$^{th}$ frame of image

The other part of data of
the N$^{th}$ frame of image

FB1

FB2

FB0

Full data of the N$^{th}$
frame of image

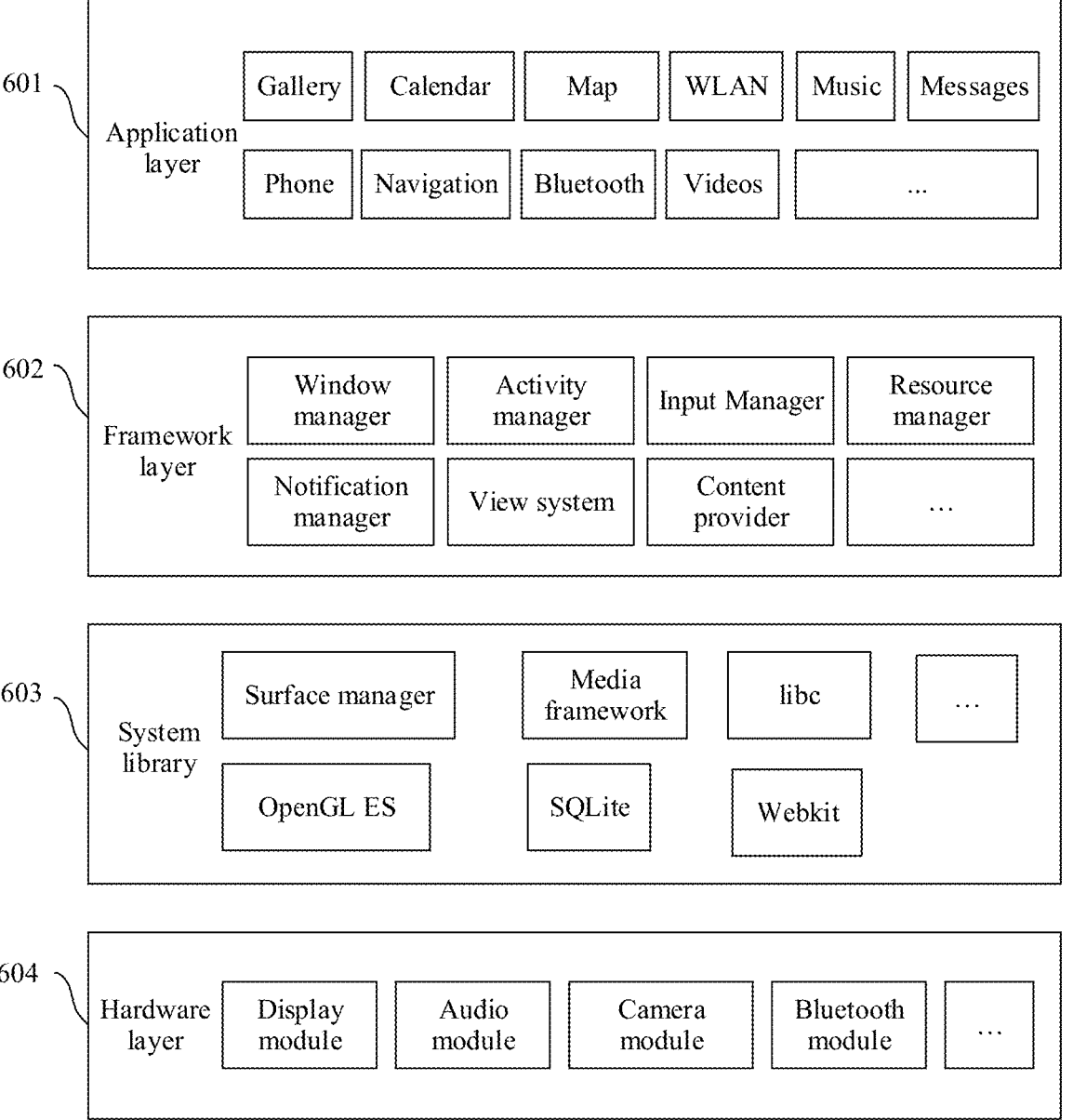

601 — Application layer

| Gallery | Calendar | Map | WLAN | Music | Messages |
|---|---|---|---|---|---|
| Phone | Navigation | Bluetooth | Videos | ... | |

602 — Framework layer

| Window manager | Activity manager | Input Manager | Resource manager |
|---|---|---|---|
| Notification manager | View system | Content provider | ... |

603 — System library

| Surface manager | Media framework | libc | ... |
|---|---|---|---|
| OpenGL ES | SQLite | Webkit | |

604 — Hardware layer

| Display module | Audio module | Camera module | Bluetooth module | ... |
|---|---|---|---|---|

FIG. 6

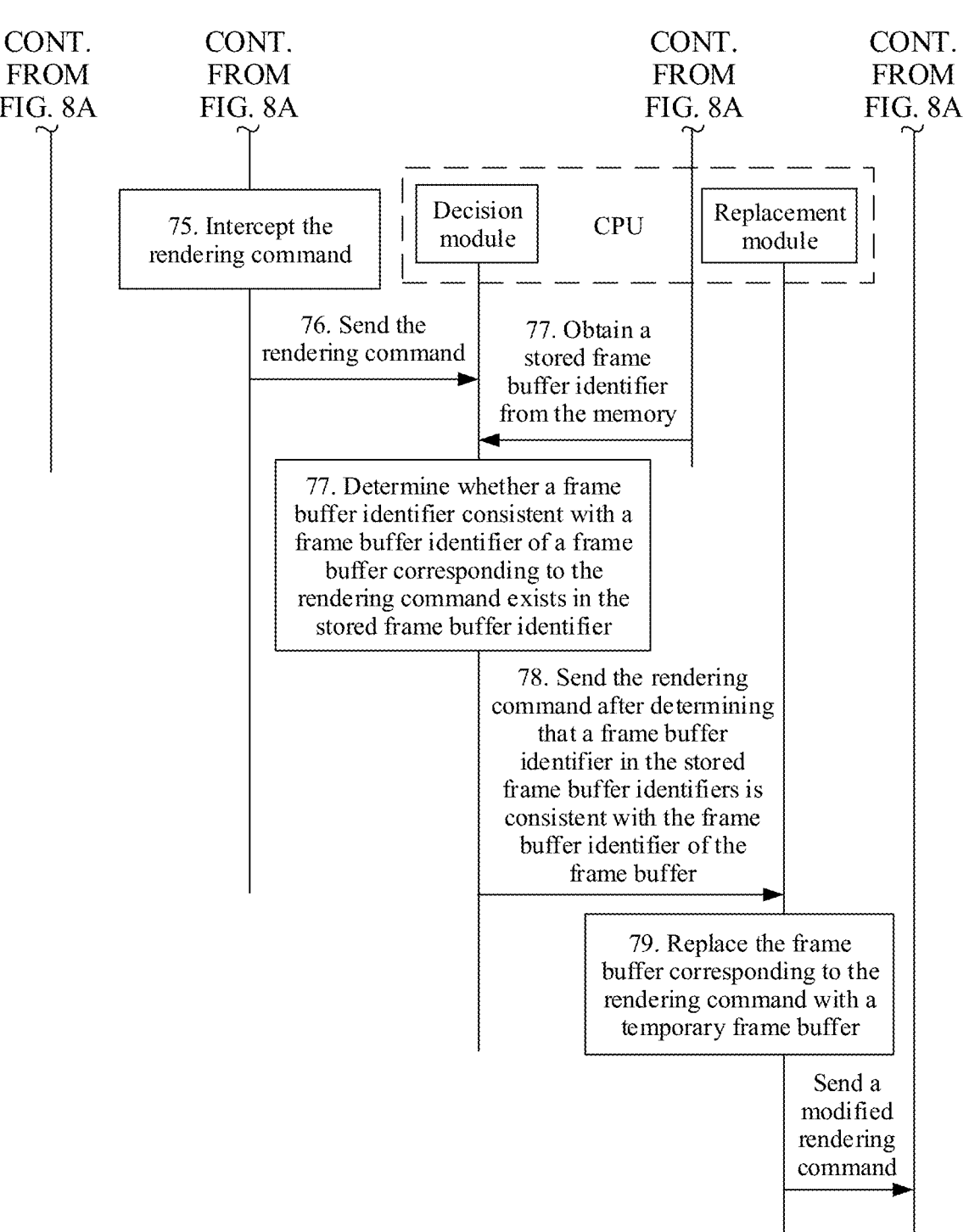

CONT.
FROM
FIG. 8A

CONT.
FROM
FIG. 8A

CONT.
FROM
FIG. 8A

CONT.
FROM
FIG. 8A

75. Intercept the
rendering command

Decision
module     CPU     Replacement
module

76. Send the
rendering command

77. Obtain a
stored frame
buffer identifier
from the memory

77. Determine whether a frame
buffer identifier consistent with a
frame buffer identifier of a frame
buffer corresponding to the
rendering command exists in the
stored frame buffer identifier 78. Send the rendering
command after determining
that a frame buffer
identifier in the stored
frame buffer identifiers is
consistent with the frame
buffer identifier of the
frame buffer 79. Replace the frame
buffer corresponding to the
rendering command with a
temporary frame buffer Send a
modified
rendering
command

FIG. 8B

IMAGE RENDERING OPTIMIZATION METHOD, ELECTRONIC DEVICE, AND STORAGE MEDIUM

CROSS-REFERENCE TO RELATED APPLICATIONS

This application is a national stage of International Application No. PCT/CN2022/114624, filed on Aug. 24, 2022, which claims priority to Chinese Patent Application No. 202111681775.6, filed on Dec. 30, 2021. The disclosures of both of the aforementioned applications are hereby incorporated by reference in their entireties.

TECHNICAL FIELD

This application relates to the field of image processing, and in particular, to an image processing method, an electronic device, and a storage medium.

BACKGROUND

An electronic device can display images with different resolution, and an image with higher resolution can provide better visual experience. However, before displaying an image to a user, the electronic device needs to render the image. Therefore, the image with higher resolution means heavier rendering load, which increases computation and power consumption overheads of the electronic device in a rendering process, and causes a problem such as severe heating or freezing of the electronic device.

SUMMARY

In view of the foregoing content, an image processing method, an electronic device, and a storage medium need to be provided, to perform a rendering operation on a partial scene in an image by using relatively low resolution, so as to reduce computation and power consumption overheads of an electronic device in an image rendering process.

To achieve the foregoing objective, the following technical solutions are used in embodiments of this application.

According to a first aspect, an embodiment of this application provides an image processing method, applied to an electronic device. An application runs on the electronic device, and the method includes: receiving a frame buffer resource creation command delivered by the application, where a frame buffer corresponding to the frame buffer resource creation command includes a color attachment; storing, in preset storage space, a frame buffer identifier of a frame buffer whose quantity of color attachments meets a preset quantity condition; receiving a rendering command delivered by the application, where the rendering command corresponds to a first frame buffer; and performing a rendering operation corresponding to the rendering command on a second frame buffer if a frame buffer identifier consistent with a frame buffer identifier of the first frame buffer exists in the preset storage space, where resolution of the second frame buffer is lower than resolution of the first frame buffer. In the foregoing technical solution, a rendering operation on a partial scene in an image may be performed by using relatively low resolution, to reduce computation and power consumption overheads of the electronic device in an image rendering process.

In an implementation, the receiving a frame buffer resource creation command delivered by the application includes: receiving a first frame buffer resource creation command delivered by the application, where the first frame buffer resource creation command corresponds to a third frame buffer, and a quantity of color attachments of the third frame buffer meets the preset quantity condition; the method further includes: storing a frame buffer identifier of the third frame buffer; and before the receiving a rendering command delivered by the application, the method further includes: receiving a second frame buffer resource creation command delivered by the application, where the second frame buffer resource creation command corresponds to a fourth frame buffer; and storing a frame buffer identifier of the fourth frame buffer if resolution of the fourth frame buffer is the same as resolution of the third frame buffer.

In the foregoing technical solution, after a frame buffer whose quantity of color attachments meets the preset quantity condition is recognized, a primary frame buffer may be directly determined in a subsequently received frame buffer resource creation command based on resolution of the frame buffer. The primary frame buffer does not need to be determined based on a quantity of color attachments, so that computation in a recognition process can be reduced, and efficiency of determining the primary frame buffer can be improved.

In an implementation, after the receiving a rendering command delivered by the application, the method further includes: determining whether a frame buffer identifier consistent with the frame buffer identifier of the first frame buffer exists in the preset storage space.

In an implementation, before the storing, in preset storage space, a frame buffer identifier of a frame buffer whose quantity of color attachments meets a preset quantity condition, the method further includes: determining whether a quantity of color attachments of the frame buffer corresponding to the frame buffer resource creation command meets the preset quantity condition.

In an implementation, before the performing a rendering operation corresponding to the rendering command on a second frame buffer, the method further includes: replacing the first frame buffer with the second frame buffer. The first frame buffer in the rendering command is replaced with the second frame buffer, so that the rendering operation corresponding to the rendering command can be completed on the second frame buffer.

In an implementation, before the storing a frame buffer identifier of the fourth frame buffer if resolution of the fourth frame buffer is the same as resolution of the third frame buffer, the method further includes: obtaining the resolution of the third frame buffer and the resolution of the fourth frame buffer.

In an implementation, after the receiving a frame buffer resource creation command delivered by the application, the method further includes: determining the quantity of color attachments of the frame buffer corresponding to the frame buffer resource creation command.

In an implementation, the electronic device includes a processor and an internal memory, and the method further includes: receiving, by the processor, the frame buffer resource creation command delivered by the application, where the frame buffer corresponding to the frame buffer resource creation command includes the color attachment; sending, by the processor, the frame buffer identifier of the frame buffer whose quantity of color attachments meets the preset quantity condition to the internal memory; and storing, by the internal memory, the frame buffer identifier sent by the processor. The processor determines the frame buffer whose quantity of color attachments meets the preset quantity condition as a primary frame buffer. This improves accuracy of determining the primary frame buffer. In addition, the internal memory is controlled to store the frame buffer identifier of the determined primary frame buffer. This facilitates subsequent invocation of the stored frame buffer identifier, and improves image processing efficiency.

In an implementation, the receiving, by the processor, the frame buffer resource creation command delivered by the application includes: receiving, by the processor, a first frame buffer resource creation command delivered by the application, where the first frame buffer resource creation command corresponds to a third frame buffer, and a quantity of color attachments of the third frame buffer meets the preset quantity condition; the method further includes: storing, by the internal memory, a frame buffer identifier of the third frame buffer; and before the receiving a rendering command delivered by the application, the method further includes: receiving, by the processor, a second frame buffer resource creation command delivered by the application, where the second frame buffer resource creation command corresponds to a fourth frame buffer; and sending, by the processor, a frame buffer identifier of the fourth frame buffer to the internal memory if resolution of the fourth frame buffer is the same as resolution of the third frame buffer.

In the foregoing technical solution, after recognizing a frame buffer whose quantity of color attachments meets the preset quantity condition, the processor may directly determine a primary frame buffer in a subsequently received frame buffer resource creation command based on resolution of the frame buffer. The primary frame buffer does not need to be determined based on a quantity of color attachments, so that computation in a recognition process can be reduced, and efficiency of determining the primary frame buffer can be improved.

In an implementation, after the receiving a rendering command delivered by the application, the method further includes: obtaining, by the processor, a stored frame buffer identifier from the internal memory.

In an implementation, after the receiving a rendering command delivered by the application, the method further includes: determining, by the processor, whether a frame buffer identifier consistent with the frame buffer identifier of the first frame buffer exists in the stored frame buffer identifier.

In an implementation, the electronic device includes a graphics processing unit, and the method further includes: sending, by the processor, the frame buffer resource creation command to the graphics processing unit, where the frame buffer resource creation command is used to instruct the graphics processing unit to create the frame buffer corresponding to the frame buffer resource creation command.

In an implementation, the performing a rendering operation corresponding to the rendering command on a second frame buffer includes: replacing, by the processor, the first frame buffer in the rendering command with the second frame buffer; sending, by the processor, the rendering command to the graphics processing unit; and performing, by the graphics processing unit, the rendering operation corresponding to the rendering command on the second frame buffer. The processor replaces the first frame buffer in the rendering command with the second frame buffer, so that the graphics processing unit can perform the rendering operation corresponding to the rendering command on the second frame buffer. This reduces computation power consumption of the electronic device in an image rendering process, and reduces heat of the electronic device.

In an implementation, the processor includes an interception module and a recognition module, and the receiving, by the processor, the frame buffer resource creation command delivered by the application includes: intercepting, by the interception module, the frame buffer resource creation command delivered by the application, and sending the frame buffer resource creation command to the recognition module; and receiving, by the recognition module, the frame buffer resource creation command.

In an implementation, the receiving, by the recognition module, the frame buffer resource creation command includes: receiving, by the recognition module, a first frame buffer resource creation command, where the first frame buffer resource creation command corresponds to a third frame buffer, and a quantity of color attachments of the third frame buffer meets the preset quantity condition; the method further includes: storing, by the internal memory, a frame buffer identifier of the third frame buffer; and before the receiving a rendering command delivered by the application, the method further includes: receiving, by the recognition module, a second frame buffer resource creation command, where the second frame buffer resource creation command corresponds to a fourth frame buffer; and sending, by the recognition module, a frame buffer identifier of the fourth frame buffer to the internal memory if resolution of the fourth frame buffer is the same as resolution of the third frame buffer.

In an implementation, the processor includes a decision module, and after the obtaining, by the processor, a stored frame buffer identifier from the internal memory, the method further includes: determining, by the decision module, whether a frame buffer identifier consistent with the frame buffer identifier of the first frame buffer exists in the stored frame buffer identifier.

In an implementation, the processor includes a replacement module, and before the replacing, by the processor, the first frame buffer in the rendering command with the second frame buffer, the method further includes: sending, by the decision module, the rendering command to the replacement module if a frame buffer identifier consistent with the frame buffer identifier of the first frame buffer exists in the preset storage space; the replacing, by the processor, the first frame buffer in the rendering command with the second frame buffer includes: replacing, by the replacement module, the first frame buffer corresponding to the rendering command with the second frame buffer; and the sending, by the processor, the rendering command to the graphics processing unit includes: sending, by the replacement module, rendering command to the graphics processing unit.

According to a second aspect, an embodiment of this application provides an image processing method, applied to an electronic device. An application runs on the electronic device, and the method includes: obtaining historical rendering data corresponding to the application; determining historical resolution based on a quantity of color attachments corresponding to a historical frame buffer in the historical rendering data; determining a frame buffer corresponding to a frame buffer resource creation command delivered by the application; sending a frame buffer identifier of a frame buffer whose resolution is the same as the historical resolution to preset storage space; receiving a rendering command delivered by the application, where the rendering command corresponds to a fifth frame buffer; and performing a rendering operation corresponding to the rendering command on a sixth frame buffer if a frame buffer identifier consistent with a frame buffer identifier of the fifth frame buffer exists in the preset storage space, where resolution of the sixth frame buffer is lower than resolution of the fifth frame buffer.

In the foregoing technical solution, the electronic device can determine the historical resolution based on the quantity of color attachments corresponding to the historical frame buffer in the historical rendering data, to determine a main scene in a rendering process, so that a rendering operation on a partial scene in an image may be performed by using relatively low resolution, to reduce computation and power consumption overheads of the electronic device in an image rendering process.

In an implementation, the determining historical resolution based on a quantity of color attachments corresponding to a historical frame buffer in the historical rendering data includes: determining whether a quantity of color attachments of a historical frame buffer in the historical rendering data meets a preset quantity condition; and determining resolution of the historical frame buffer as the historical resolution if the quantity of color attachments of the historical frame buffer meets the preset quantity condition. Whether the historical frame buffer is a historical primary frame buffer is determined based on whether the quantity of color attachments of the historical frame buffer meets the preset quantity condition. This can improve accuracy of determining the historical primary frame buffer.

In an implementation, after the determining resolution of a frame buffer corresponding to a frame buffer resource creation command delivered by the application, the method further includes: comparing the resolution of the frame buffer corresponding to the frame buffer resource creation command with the historical resolution.

In an implementation, after the receiving a rendering command delivered by the application, the method further includes: determining whether a frame buffer identifier consistent with the frame buffer identifier of the fifth frame buffer exists in the preset storage space.

In an implementation, before the performing a rendering operation corresponding to the rendering command on a sixth frame buffer, the method further includes: replacing the fifth frame buffer with the sixth frame buffer. The fifth frame buffer is replaced with the sixth frame buffer, so that the rendering operation corresponding to the rendering command can be completed on the sixth frame buffer.

According to a third aspect, an embodiment of this application provides an electronic device. The electronic device includes a memory and a processor. The memory is configured to store program instructions. The processor is configured to read the program instructions stored in the memory, to implement the foregoing image processing method.

According to a fourth aspect, an embodiment of this application provides a computer-readable storage medium. The computer-readable storage medium stores computer-readable instructions, and when the computer-readable instructions are executed by a processor, the foregoing image processing method is implemented.

In addition, for technical effects brought by the third aspect and the fourth aspect, refer to related descriptions of the methods in the foregoing method parts. Details are not described herein again.

BRIEF DESCRIPTION OF DRAWINGS

FIG. 6 is a block diagram of a software structure of an electronic device according to an embodiment of this application;

FIG. 8A and FIG. 8B are a flowchart of an image processing method according to an embodiment of this application.

DESCRIPTION OF EMBODIMENTS

Figure 1A:
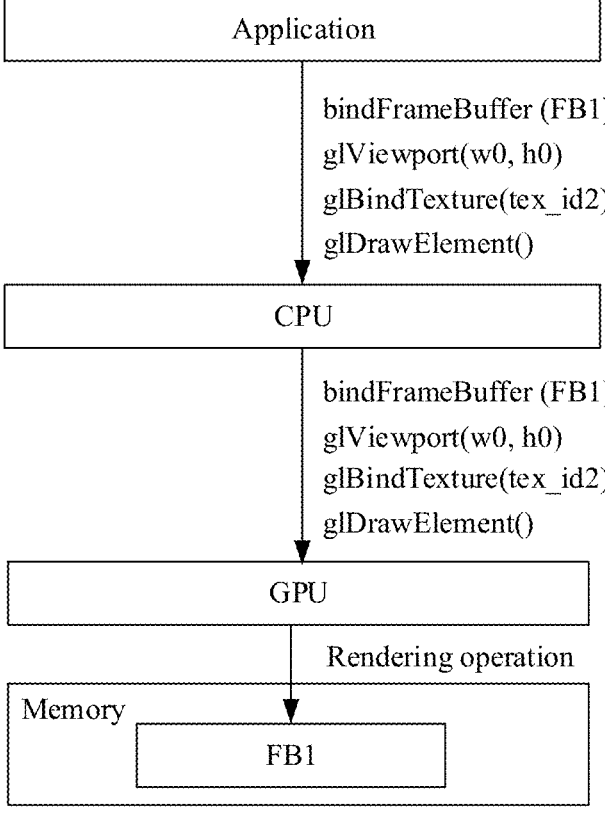
FIG. 1A is a schematic diagram of delivering a rendering command according to an embodiment of this application.

The following terms "first" and "second" are merely used for description, but should not be understood as indicating or implying relative importance or implying a quantity of indicated technical features. Therefore, a feature limited by "first" or "second" may explicitly or implicitly include one or more features. In descriptions of embodiments of this application, words such as "example" or "for example" are used to represent giving examples, illustrations, or descriptions. Any embodiment or design solution described as "example" or "for example" in embodiments of this application should not be construed as being more preferred or advantageous than other embodiments or design solutions. Specifically, the words such as "example" or "for example" are used to present related concepts in a specific manner.

Unless otherwise specified, all technical and scientific terms used in this specification have meanings that are the same as those commonly understood by a person skilled in the art of this application. The terms used in the specification of this application are merely intended to describe specific embodiments, but are not intended to limit this application. It should be understood that, in this application, unless otherwise stated, "/" indicates "or". For example, A/B may indicate A or B. In this application, "and/or" is merely an association relationship that describes associated objects, and indicates that three relationships may exist. For example, A and/or B may indicate the following three cases: Only A exists, both A and B exist, and only B exists. "At least one" means one or more. "A plurality of" means two or more. For example, at least one of a, b, or c may indicate the following seven cases: a, b, c, a and b, a and c, b and c, and a, b, and c.

When a user uses an electronic device, the electronic device may display a multimedia streaming file to the user by using a display, to provide rich visual experience for the user.

For example, a multimedia stream is a video stream. The video stream may include a plurality of frames of images. When displaying the video stream, the electronic device may separately display, on the display, the plurality of frames of images corresponding to the video stream. When a frequency at which the electronic device switches to display an image is higher than a frequency that can be distinguished by a human eye, different images can be switched for display in an unaware state of the user, to achieve a continuous viewing process effect.

The electronic device may include a central processing unit (Central Processing Unit, CPU) and a graphics processing unit (Graphics Processing Unit, GPU). An application may send rendering commands for different images to the CPU, to play a video stream on the electronic device. The CPU may control, according to these rendering commands, the GPU to render each frame of image, and rendered data may be stored in a default frame buffer (provided frame buffer). The default frame buffer may be storage space configured by the electronic device in a memory for an image that currently needs to be displayed, and may be created before image rendering. Content included in the default frame buffer may be all presented on a screen. In other words, when the electronic device needs to display an image, the electronic device may control, based on data that is corresponding to the image and that is stored in the default frame buffer, the display to display the image.

In some implementations, when displaying the $(N-1)^{th}$ frame of image, the electronic device may render, according to a rendering command delivered by an application, an image to be subsequently displayed (for example, the $N^{th}$ frame), to obtain data for displaying the $N^{th}$ frame of image. It may be understood that, in an image rendering process, the electronic device needs to store a rendering result for subsequent use. Therefore, in this example, the electronic device may configure the default frame buffer in the memory before rendering the $N^{th}$ frame of image. The default frame buffer may correspond to the storage space in the memory. In an image rendering process, all geometric graphics (such as a character, a house, a backpack, a tree, grass, a map, and a user interface (User Interface, UI) control) included in an image need to be rendered, and a rendering result is stored in the default frame buffer. Specific content corresponding to the geometric graphics may be set according to an actual situation. This is not limited herein. For example, one character in the image may be determined as one geometric graphic, or a head of one character in the image may be determined as one geometric graphic, and a body of the character is determined as another geometric graphic.

In some embodiments of this application, if one frame of image includes a relatively large quantity of geometric graphics or includes geometric graphics with different display effects, storage space of the default frame buffer may be insufficient. In addition, because the storage space of the default frame buffer is insufficient, the electronic device cannot flexibly render the frame of image, and an ideal effect may not be achieved. Therefore, a plurality of frame buffers usually need to be created to implement rendering, for example, an application created frame buffer (Application created frame buffer). The frame buffer may be created by using the GPU. After the electronic device creates the plurality of frame buffers, the electronic device may separately store content of the image in the plurality of frame buffers, then fuse the content stored in the plurality of frame buffers, and finally transfer fused content to the default frame buffer corresponding to the image. The application created frame buffer has a function similar to that of the default frame buffer, and is used to store a rendering result corresponding to the image. An only difference lies in that content in the application created frame buffer is not directly presented on the screen, and off-screen rendering (Off-Screen Rendering) is implemented, but content in the default frame buffer is directly presented on the screen, and on-screen rendering (On-Screen Rendering) is implemented.

On-screen rendering, also referred to as current screen rendering, means that a rendering operation is performed in a screen buffer (default frame buffer) currently used for display. Off-screen rendering means that a rendering operation is performed in a buffer (application created frame buffer) other than a screen buffer (default frame buffer) currently used for display.

For example, an image A includes a relatively large quantity of geometric graphics. Before the image A is rendered, two frame buffers (FB1, FB2) may be created. During rendering, when the geometric graphics of the image A are stored, FB1 may be used to store a part of the geometric graphics of the image A, and FB2 may store the other part of the geometric graphics of the image A. Finally, FB1 and FB2 are fused, and fused content is transferred to a default frame buffer (FB0) corresponding to the image A. Content stored in FB1 and FB2 is not directly presented on the screen, and off-screen rendering is implemented. Content in FB0 is directly presented on the screen, and on-screen rendering is implemented.

FIG. TA shows an example of a rendering command corresponding to FB1. A to-be-rendered image is the $N^{th}$ frame of image, corresponding frame buffers include FB1, FB2, and FB0, and FB0 is a default frame buffer. The rendering command delivered by an application may include a glBindFrameBuffer (FB1) function, so that a current rendering operation is bound to FB1. After FB1 is bound, a drawing size (w0, h0) during a rendering operation performed in the frame buffer may be determined by using a glViewport function. A value of (w0, h0) is determined based on resolution of the frame buffer (FB1), and the value of (w0, h0) may be the same as the resolution of the frame buffer. A glBindTexture function may be used to determine drawn content (tex_id2). A glDrawElement function may be used to implement the rendering operation on FB1. For example, when executing an instruction of glBindFrameBuffer (FB1), the central processing unit (Central Processing Unit/Processor, CPU) may determine that an active (active) frame buffer is FB1. The application may deliver functions such as the glViewport function, the glBindTexture function, and the glDrawElement function that need to be performed on FB1, so that the GPU determines that the rendering operation related to the rendering command may be performed on FB1, and stores a result in FB1.

Figure 1B:
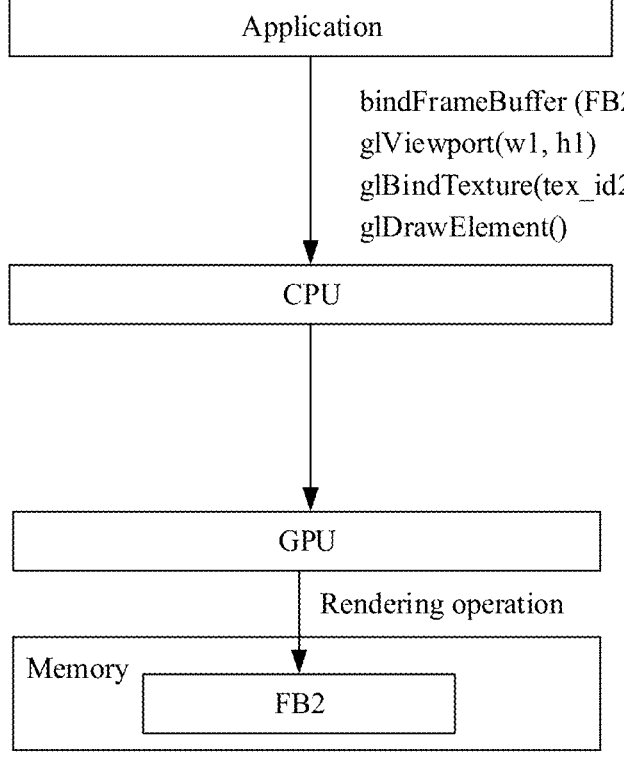
FIG. 1B is a schematic diagram of delivering a rendering command according to an embodiment of this application.

For a rendering operation that needs to be performed by using FB2, similarly, with reference to FIG. 1B, when executing an instruction of glBindFrameBuffer (FB2), the CPU may determine that an active frame buffer is FB2. The application may deliver functions such as the glViewport function, the glBindTexture function, and the glDrawElement function that need to be performed on FB2, so that the GPU determines that the rendering operation related to the rendering command may be performed on FB2, and stores a result in FB2, to complete rendering of related data on FB2.

In this way, rendering commands for all frame buffers (FB1 and FB2) corresponding to the image A can be completed.

Figure 1C:
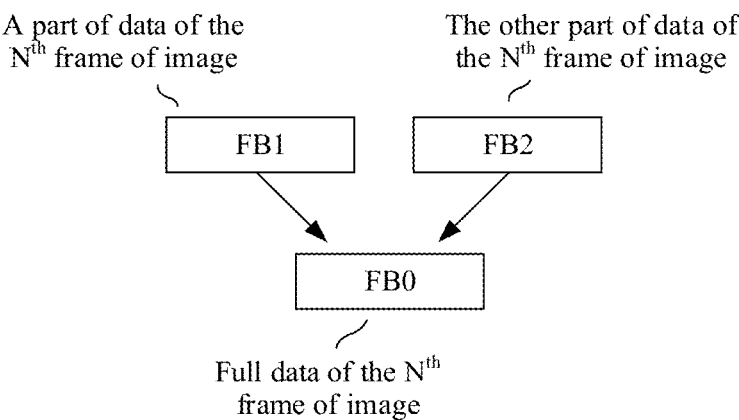
FIG. 1C is a schematic diagram of image rendering according to an embodiment of this application.

The electronic device fuses content (rendering results) stored in FB1 and FB2, and stores a fused result in FB0, so that full data corresponding to the image A can be obtained in FB0. With reference to the examples in FIG. TA and FIG. 1B, after the GPU completes rendering on FBT and FB2, corresponding data (for example, color data and/or depth data of each pixel) may be separately stored in FBT and FB2. The data (for example, data in FBT and FB2) may correspond to some geometric graphics of the image A. With reference to FIG. 1C, the electronic device may render the data in FB1 and FB2 to FB0. In this way, the full data of the image A may be obtained in FB0, and the image A may be displayed based on data in FB0.

A frame buffer may be created by using a glGenFrameBuffer function. For example, FB1 and FB2 are created by using the glGenFrameBuffer function. The frame buffer is a buffer (buffer) and can be used to store data. However, actually, information is not stored in the frame buffer, but is stored in a texture attachment (texture attachments) or a render buffer object attachment (Render buffer object attachments) bound to the frame buffer. The frame buffer provides an attachment point for binding the texture attachment and the render buffer object attachment, and the texture attachment and the render buffer object attachment are used to store attribute information, such as a location vector, a normal vector, and a texture color of a geometric graphic in an image.

Based on different target texture formats, texture attachments may be classified into a color attachment (color attachment), a depth attachment (depth attachment), and a stencil attachment (stencil attachment). At least one color attachment needs to be bound to one frame buffer. A quantity of color attachments is related to a storage quantity corresponding to a frame buffer. To be specific, if more attribute information of a geometric object in a scene needs to be stored, more color attachments need to be bound to the frame buffer. If a frame buffer corresponds to more color attachments, it indicates that more attribute information is related to the buffer, and more computation and storage bandwidth are required when the frame buffer is rendered.

Usually, a glGenTextures function may be used to create a texture. A glTexImage2D function may be used to configure a memory for the texture. The glTexImage2D function may be used to configure the memory for the texture based on resolution corresponding to the texture. A RenderBuffer function may be used to create a render buffer object. A glTexStorage2D function may be used to configure a memory for the render buffer object. The glTexStorage2D function may be used to configure the memory for the texture based on resolution corresponding to the texture. A glFramebufferTexture2D function may be used to bind the texture to a frame buffer or bind the render buffer object attachment to a frame buffer. After a texture is bound to a frame buffer, the texture may be referred to as a texture attachment. After a render buffer object is bound to a frame buffer, the render buffer object may be referred to as a render buffer object attachment.

In a resource allocation phase, the application delivers a frame buffer resource creation command. The frame buffer resource creation command is used to create a frame buffer corresponding to an image, to prepare for subsequent image rendering. When image rendering needs to be performed, the application may deliver a rendering command, to implement image rendering based on the rendering command and the created frame buffer. For example, the application may invoke an OpenGL interface in a graphics library of the electronic device to create the frame buffer corresponding to the image.

The following provides an example of an instruction stream for creating a frame buffer resource:

unsigned int FB1; //defining an ID of a frame buffer (FB), where a variable name is defined as FB1;
    glGenFramebuffers(1, &FB1); //creating an FB, where an ID value is FB1;
    glBindFramebuffer(GL_FRAMEBUFFER, FB1); //binding the frame buffer FB1;

unsigned int texture; //defining a texture, where a variable name is defined as texture;
    glGenTextures(1, &tex1); //creating a texture, where an ID value is tex1;
    glBindTexture(GL_TEXTURE_2D, tex1); //binding the texture tex1, where GL_TEXTURE_2D is used to indicate that a texture type is 2D texture;
    glTexImage2D(GL_TEXTURE_2D, 0, GL_RGB, 1280, 62, 0, GL_RGB, GL_UNSIGNED_BYTE, NULL); //allocating 1280*626 memory space to the texture tex1, where resolution corresponding to tex1 is 1280*626, the second parameter (that is, 0) in the function may be used to indicate a texture level, the third factor (that is, GL_RGB) in the function may be used to indicate a target texture format, the seventh factor (that is, GL_RGB) in the function may be used to indicate a texture format of an input parameter, and the eighth factor (that is, GL_UNSIGNED_BYTE) in the function may be used to indicate a texture data type of the input parameter;
    glFramebufferTexture2D(GL_FRAMEBUFFER, GL_COLOR_ATTACHMENT0, GL_TEXTURE_2D, tex1, 0); //binding the created texture tex1 to the frame buffer FB1, where the first factor (that is, GL_FRAMEBUFFER) in the function may be used to indicate a target, that is, binding to the frame buffer FB1; the second factor (that is, GL_COLOR_ATTACHMENT0) in the function may be used to indicate an attachment type, for example, a color attachment is added herein, where "0" in "GL_COLOR_ATTACHMENT0" indicates that a quantity of color attachments is 1, and if the second factor is GL_COLOR_ATTACHMENT1, "1" indicates that there are two color attachments; the third factor (that is, GL_TEXTURE_2D) in the function may be used to indicate an additional texture type; the fourth factor (that is, tex1) in the function may be used to indicate an additional actual texture; and the fifth factor (that is, 0) in the function may be used to indicate a level (Mipmap level), which is usually set to 0.

It can be learned from the foregoing instruction stream for creating a frame buffer that, when creating the frame buffer corresponding to the image, the electronic device configures a memory for a texture corresponding to the frame buffer. A size of the configured memory is determined by resolution and a storage format that are corresponding to a rendered image. After the memory is configured, binding of the texture and the frame buffer is completed, that is, the texture is bound to the frame buffer. The texture attachment may include a plurality of color attachments. If more color attachments are bound to the frame buffer, the frame buffer corresponds to larger storage space. In addition, a larger quantity of color attachments bound to a frame buffer indicates more attribute information in the frame buffer. In this way, the image can be rendered more finely. However, correspondingly, more attribute information in a frame buffer indicates that the frame buffer requires more computation and more computation power in a rendering process. With development of electronic devices, users have increasingly high requirements on display quality provided by the electronic devices. Each frame of image needs to be rendered with relatively high image quality. This also poses a relatively high requirement on an image processing capability of an electronic device. Consequently, power consumption and heat of the electronic device greatly increase, and user experience is affected.

To resolve the foregoing problem, embodiments of this application provides an image processing method, so that an electronic device determines a target frame buffer based on a quantity of color attachments in a frame buffer corresponding to an image, and adjusts resolution of the target frame buffer in an image rendering process, to reduce pressure on a memory and computation power in the image rendering process, and then avoid an increase in heat and power consumption of the electronic device.

The following describes in detail the solutions in embodiments of this application with reference to the accompanying drawings.

The image processing method provided in embodiments of this application may be applied to an electronic device. The electronic device may be a mobile phone, a tablet computer, a desktop computer, a laptop computer, a handheld computer, a notebook computer, an ultra-mobile personal computer (ultra-mobile personal computer, UMPC), a netbook, a cellular phone, a personal digital assistant (personal digital assistant, PDA), an artificial intelligence (artificial intelligence, AI) device, a wearable device, a vehicle-mounted device, a smart home device, and/or a smart city device. A specific form of the device is not specially limited in embodiments of this application.

For ease of description, in the following example, an application that delivers a rendering command is a game application. The game application performs related processing by using an OpenGL graphics library. It should be understood that, in another different rendering engine/rendering environment, an implementation mechanism is similar, and only a corresponding function may be different.

When a game starts to be run (loaded), the game application enters a resource allocation phase. The game application delivers a frame buffer resource creation command to a CPU, and the CPU controls a GPU to create a frame buffer corresponding to an image, to prepare for subsequent image rendering. The frame buffer resource creation command includes an instruction for generating a frame buffer and an instruction for creating a texture corresponding to the frame buffer, and includes an instruction for binding the generated texture to the frame buffer. When the game application needs to render an image, the game application may send a rendering command to the CPU. The rendering command may include a frame buffer that needs to be invoked for rendering the image, and a rendering operation that needs to be performed in each frame buffer.

In this embodiment, when the game application enters the resource allocation phase and the frame buffer corresponding to the image is created, the CPU intercepts the frame buffer resource creation command sent by the game application. The CPU determines a quantity of color attachments in each created frame buffer based on the intercepted frame buffer resource creation command, and determines a primary frame buffer (a frame buffer that has relatively high resolution and consumes a relatively large quantity of resources during processing) in frame buffers based on the quantity of color attachments in each frame buffer. For example, the CPU determines a frame buffer whose quantity of color attachments is greater than a preset threshold as the primary frame buffer, and records frame buffer information corresponding to the primary frame buffer in a pre-built storage area. The frame buffer information may include a frame buffer ID, and may further include resolution corresponding to the frame buffer.

When the game application needs to render an image, the CPU intercepts a rendering command delivered by the game application, and determines a frame buffer corresponding to the rendering command. The CPU compares the determined frame buffer with the frame buffer ID stored in the pre-built storage area, that is, compares a frame buffer ID of the frame buffer corresponding to the rendering command with the frame buffer ID stored in the pre-built storage area. If the frame buffer ID of the frame buffer corresponding to the rendering command is consistent with the frame buffer ID stored in the pre-built storage area, it is determined that comparison on the frame buffer corresponding to the rendering command succeeds. If comparison on the frame buffer corresponding to the rendering command succeeds, it is determined that the frame buffer is a primary frame buffer. A resolution reduction operation is performed on the primary frame buffer determined in the rendering command, and a rendering operation in the primary frame buffer is performed by using relatively low resolution.

In the solution provided in the foregoing embodiment, before image rendering, the CPU can determine, based on color attachments in frame buffers, the primary frame buffer that consumes a relatively large quantity of rendering resources in the image. Then, in the image rendering process, the CPU determines, based on the received rendering command, whether a frame buffer whose identifier is consistent with a previously determined primary frame buffer identifier (ID) exists in the frame buffer corresponding to the rendering command. If there is a frame buffer with a consistent ID, the CPU determines the frame buffer as the primary frame buffer, and replaces the primary frame buffer with a temporary frame buffer. Resolution of the temporary frame buffer is lower than resolution of the primary frame buffer. The temporary frame buffer is a frame buffer used to replace the primary frame buffer, and may be a frame buffer temporarily created when the CPU determines the frame buffer as the primary frame buffer. It may be understood that in another embodiment, the name of the temporary frame buffer may be replaced with another name, such as a second frame buffer. The CPU controls the GPU to perform, on the temporary frame buffer, the rendering operation corresponding to the primary frame buffer in the rendering command, to reduce computation power resources consumed by the rendering operation in the primary frame buffer, so as to reduce computation power consumption of the electronic device in the image rendering process.

Figure 2A:
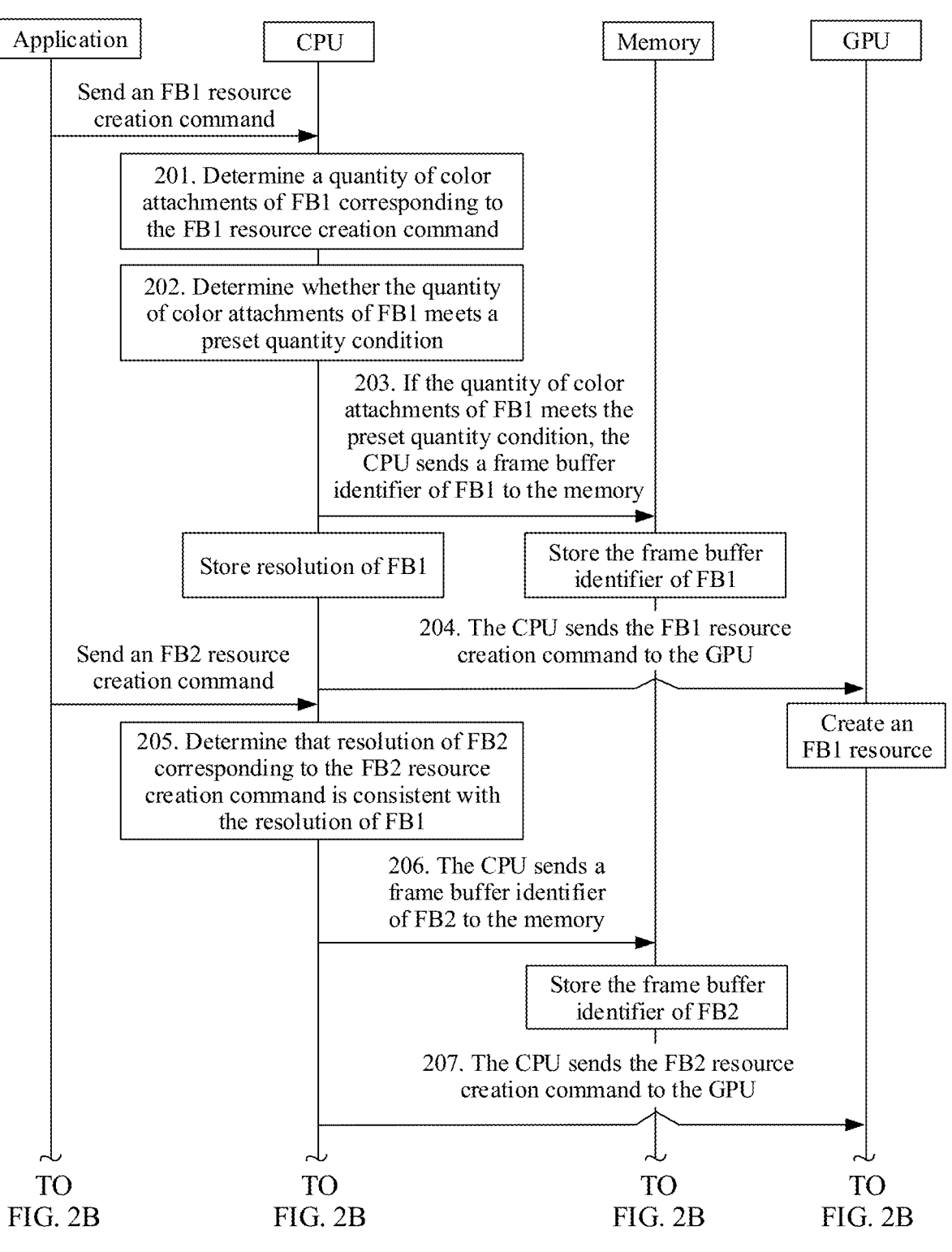
FIG. 2A and FIG. 2B are a flowchart of an image processing method according to an embodiment of this application.
Figure 2B:
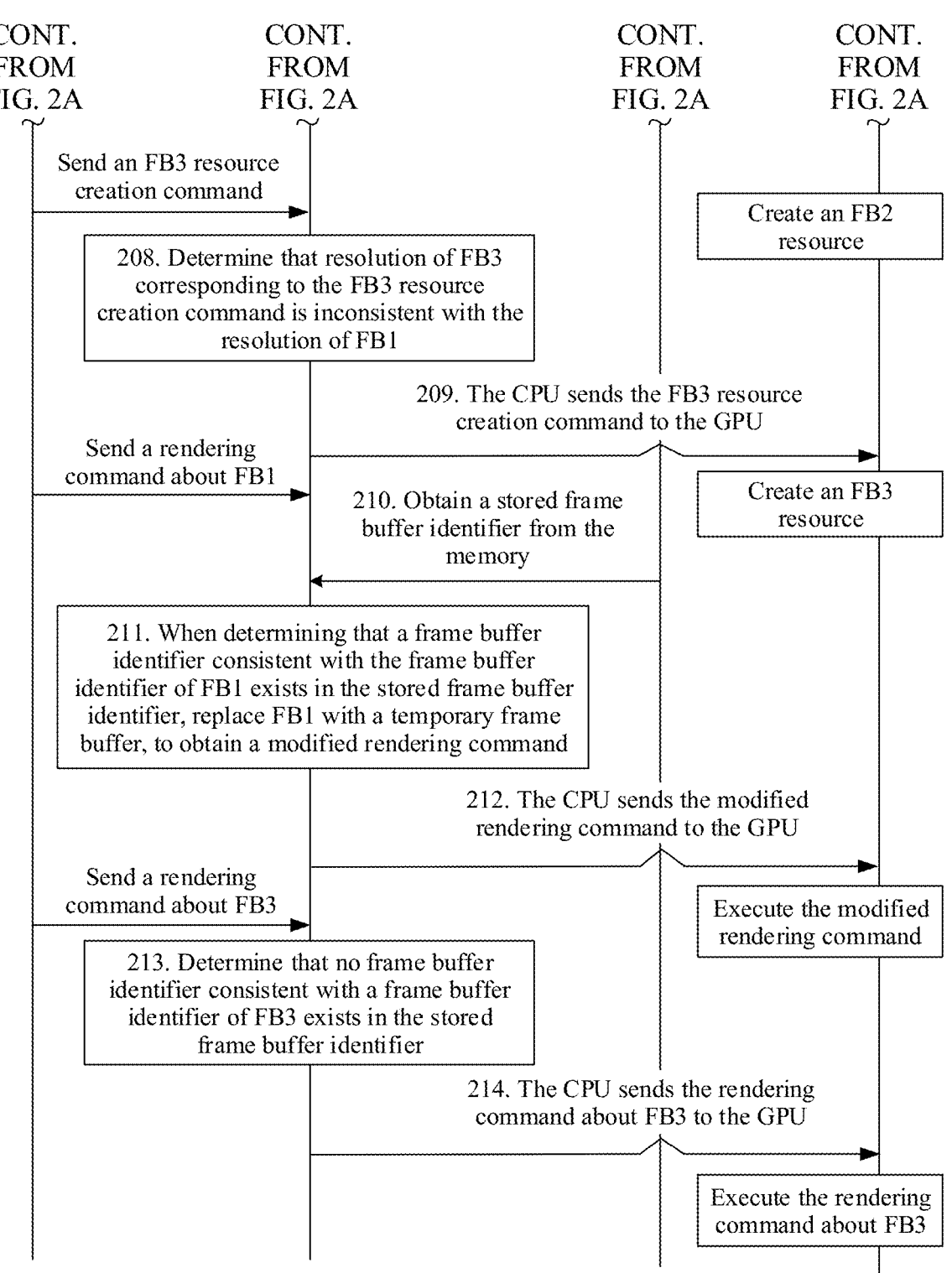

The following describes in detail the solutions in embodiments of this application with reference to examples. For example, FIG. 2A and FIG. 2B are a schematic flowchart of an image processing method according to an embodiment of this application. The method is applied to an electronic device, and the electronic device may include an application, a CPU, a GPU, and an internal memory (briefly referred to as a memory below). As shown in FIG. 2A and FIG. 2B, the method may include the following steps.

201. Determine a quantity of color attachments of FB1 corresponding to an FB1 resource creation command. In an application loading process, the application delivers a frame buffer resource creation command (such as the FB1 resource creation command or an FB2 resource creation command) to the CPU, and the frame buffer resource creation command is used to create a frame buffer corresponding to an image, to prepare for subsequent image rendering. The image may be a to-be-rendered target image. The frame buffer resource creation command includes a glGenFrameBuffer function, a glGenTextures function, a glTexImage2D function, a glFramebufferTexture2D function, and the like. The glGen-FrameBuffer function is used to create a frame buffer (FB) and assign a frame buffer identifier such as an ID value to the created FB. The glGenTextures function is used to create a texture, and the glTexImage2D function is used to configure a memory for the created texture. The glFramebufferTexture2D function is used to bind the created texture to the frame buffer. Resolution corresponding to the texture, that is, resolution corresponding to the frame buffer, may be determined by recognizing the glTexImage2D function in the frame buffer resource creation command. A color attachment bound to the frame buffer and an attachment quantity corresponding to the color attachment may be determined by recognizing the glFramebufferTexture2D function in the frame buffer resource creation command.

The following provides an example of binding a texture to a frame buffer:

glBindFramebuffer(GL_FRAMEBUFFER, FB1); //binding the frame buffer FB1;

glFramebufferTexture2D(GL_FRAMEBUFFER, GL_COLOR_ATTACHMENT0, GL_TEXTURE_2D, tex0, 0); //binding the created texture tex0 to the frame buffer FB1, where the first factor (that is, GL_FRAME-BUFFER) in the function may be used to indicate a target, that is, binding to the frame buffer; the second factor (that is, GL_COLOR_ATTACHMENT0) in the function may be used to indicate an attachment type, where the first color attachment is added herein; the third factor (that is, GL_TEXTURE_2D) in the function may be used to indicate an additional texture type; the fourth factor (that is, tex0) in the function may be used to indicate an additional actual texture; and the fifth factor (that is, 0) in the function may be used to indicate a level (Mipmap level), which is usually set to 0.

One glFramebufferTexture2D function may correspond to one texture. A plurality of glFramebufferTexture2D functions may be delivered for one frame buffer, and a plurality of textures are bound to the frame buffer.

For example, three glFramebufferTexture2D functions may be delivered for FB1, and code is shown as follows:

glBindFramebuffer(GL_FRAMEBUFFER, FB1);
glFramebufferTexture2D(GL_FRAMEBUFFER, GL_COLOR_ATTACHMENT0, GL_TEXTURE_2D, tex0, 0);
glFramebufferTexture2D(GL_FRAMEBUFFER, GL_COLOR_ATTACHMENT1, GL_TEXTURE_2D, tex1, 0);
glFramebufferTexture2D(GL_FRAMEBUFFER, GL_COLOR_ATTACHMENT2, GL_TEXTURE_2D, tex2, 0).

Different color attachment identifiers correspond to different color attachment quantities. The following describes attachment identifiers of color attachments. The attachment identifiers of the color attachments start from GL_COLOR_ATTACHMENT0. GL_COLOR_ATTACHMENT0 indicates the first color attachment, GL_COLOR_ATTACHMENT1 indicates the second color attachment, and GL_COLOR_ATTACHMENT2 indicates the third color attachment. A quantity of color attachments bound to a frame buffer may be determined by identifying an attachment identifier of a color attachment of the frame buffer. For example, an attachment identifier of the color attachment of FB1 (GL_COLOR_ATTACHMENT2) may be identified, and it may be determined that a quantity of color attachments bound to FB1 is 3.

202. Determine whether the quantity of color attachments of FB1 meets a preset quantity condition.

Each frame buffer includes one or more color attachments. A quantity of color attachments is related to a storage quantity corresponding to a frame buffer. To be specific, if a frame buffer corresponds to more stored geometric graphic attribute information, more color attachments need to be bound to the frame buffer. If a frame buffer corresponds to more color attachments, it indicates that the frame buffer corresponds to a heavier rendering task, and more computation power is required when the frame buffer is rendered. Therefore, a primary frame buffer may be determined in the frame buffer corresponding to the frame buffer resource creation command based on the quantity of color attachments. The primary frame buffer may be a frame buffer in which a rendering task is relatively heavy, rendering resolution is relatively high, and a quantity of performed rendering operations is relatively large in a rendering process.

The preset quantity condition may be set according to an actual situation. In some embodiments of this application, the preset quantity condition may be that a quantity of color attachments of a frame buffer is greater than a preset quantity threshold. A quantity threshold is preset, and a specific value of the quantity threshold is not limited herein. The quantity threshold may be set according to an actual situation, for example, the quantity threshold may be set to 2. If a quantity of color attachments of a frame buffer is greater than the preset quantity threshold, it is determined that the frame buffer corresponds to a heavier task, more geometric graphic attribute information needs to be stored, and more computation power is consumed when the frame buffer is rendered. If a quantity of color attachments corresponding to a frame buffer meets the preset quantity condition, the frame buffer is determined as a primary frame buffer. It should be understood that the preset quantity condition may alternatively be that a quantity of color attachments of a frame buffer is greater than or equal to the preset quantity threshold, or may be that a quantity of color attachments of a frame buffer is not less than the preset quantity threshold. No limitation is imposed on the preset quantity condition herein.

203. If the quantity of color attachments of FB1 meets the preset quantity condition, the CPU sends a frame buffer identifier of FB1 to the memory.

For example, the quantity of color attachments of FB1 corresponding to the FB1 resource creation command is 3, the preset quantity condition is that a quantity of color attachments of a frame buffer is greater than a preset quantity threshold, and the preset quantity threshold is 2. The quantity of color attachments of FB1 is greater than the preset quantity threshold, and meets the preset quantity condition. FB1 is determined as a primary frame buffer, and the CPU sends the frame buffer identifier of FB1 to the memory. Frame buffer information may include a frame buffer ID, and may further include resolution corresponding to the frame buffer.

204. The CPU sends the FB1 resource creation command to the GPU.

The GPU creates an FB1 resource based on the received FB1 resource creation command.

It should be understood that before sending the FB1 resource creation command to the CPU, the application may previously send another frame buffer resource creation command such as an FB0 resource creation command to the CPU. However, a quantity of color attachments of a frame buffer corresponding to a frame buffer resource creation command received by the CPU before the FB1 resource creation command does not meet the preset quantity condition.

205. Determine that resolution of FB2 corresponding to FB2 resource creation command is consistent with resolution of FB1.

The application sends the FB2 resource creation command to the CPU. After receiving the FB2 resource creation command, the CPU determines the resolution of FB2 corresponding to the FB2 resource creation command.

The CPU compares the resolution of FB2 with the resolution of FB1, and determines whether the resolution of FB2 is consistent with the resolution of FB1.

If the resolution of FB2 is consistent with the resolution of FB1, FB2 is determined as a primary frame buffer. The CPU sends a frame buffer identifier of FB2 to the memory for storage. For example, the resolution of FB1 is 1280×626, the resolution of FB2 is 1280×626, and the resolution of FB2 is consistent with the resolution of FB1. In this case, whether a quantity of color attachments of FB2 meets the preset quantity condition does not need to be determined, FB2 is directly determined as the primary frame buffer, and the frame buffer identifier of FB2 is sent to the memory for storage.

In some implementations, resolution of a frame buffer may be determined by performing a glGetIntegerv function on the frame buffer. For example, the resolution of FB1 is determined by performing the glGetIntegerv function on FB1. In some implementations, the CPU may store the resolution of FB1 in a preset storage area. The resolution of FB1 is stored, so that when another frame buffer resource creation command is received subsequently, whether a frame buffer corresponding to the another frame buffer resource creation command is a primary frame buffer can be more quickly determined based on the resolution of FB1.

206. The CPU sends the frame buffer identifier of FB2 to the memory.

If the resolution of FB2 is consistent with the resolution of FB1, FB2 is determined as a primary frame buffer. The CPU sends the frame buffer identifier of FB2 to the memory for storage. For example, the resolution of FB1 is 1280×626, the resolution of FB2 is 1280×626, and the resolution of FB2 is consistent with the resolution of FB1. In this case, whether a quantity of color attachments of FB2 meets the preset quantity condition does not need to be determined, FB2 is directly determined as the primary frame buffer, and the frame buffer identifier of FB2 is sent to the memory for storage.

207. The CPU sends the FB2 resource creation command to the GPU.

The GPU creates an FB2 resource based on the received FB2 resource creation command.

208. Determine that resolution of FB3 corresponding to FB3 resource creation command is inconsistent with the resolution of FB1.

The application sends the FB3 resource creation command to the CPU. After receiving the FB3 resource creation command, the CPU determines the resolution of FB3 corresponding to the FB3 resource creation command. The CPU compares the resolution of FB3 with the resolution of FB1, and determines whether the resolution of FB3 is consistent with the resolution of FB1.

The resolution of FB3 is inconsistent with the resolution of FB1, and it is determined that FB3 is not a primary frame buffer. Therefore, a frame buffer identifier of FB3 does not need to be stored in the memory. For example, the resolution of FB1 is 1280×626, the resolution of FB3 is 640×313, and the resolution of FB3 is inconsistent with the resolution of FB1. It is determined that FB3 is not a primary frame buffer, and the frame buffer identifier of FB3 does not need to be stored in the memory.

209. The CPU sends the FB3 resource creation command to the GPU.

210. Obtain a stored frame buffer identifier from the memory.

When the application needs to render an image, the application delivers a rendering command, such as a rendering command about FB1, to the CPU. The rendering command is used to render a frame buffer corresponding to the image. For example, the rendering command about FB1 is used to render FB1. The rendering command may specifically include a glBindFrameBuffer function, a glViewport function, a glBindTexture function, and a glDrawElement function. For description of a related function in the rendering command, refer to the foregoing description. Details are not described herein again. The frame buffer corresponding to the rendering command may be determined based on the glBindFrameBuffer function, that is, a frame buffer bound to the glBindFrameBuffer function is determined as a to-be-rendered frame buffer.

When the CPU receives the rendering command, the CPU may obtain the frame buffer identifier stored in the memory. It should be understood that when the CPU receives the rendering command for the first time, after the CPU obtains the frame buffer identifier stored in the memory, the CPU may store the stored frame buffer identifier in preset storage space in the CPU. When subsequently receiving a rendering command again, the CPU does not need to obtain the stored frame buffer identifier from the memory, but may directly read the stored frame buffer identifier from the preset storage space in the CPU. In some other embodiments, the CPU may alternatively obtain the stored frame buffer identifier from the memory each time the CPU receives a rendering command. This application sets no limitation on implementation of the step of obtaining the stored frame buffer identifier from the memory.

211. When determining that a frame buffer identifier consistent with the frame buffer identifier of FB1 exists in the stored frame buffer identifier, replace FB1 with a temporary frame buffer, to obtain a modified rendering command.

The CPU receives the rendering command about FB1, and the CPU determines whether a frame buffer identifier consistent with the frame buffer identifier of FB3 exists in the stored frame buffer identifier.

After determining that a frame buffer identifier consistent with the frame buffer identifier of FB1 exists in the stored frame buffer identifier, the CPU determines FB1 as a primary frame buffer. The CPU replaces FB1 with the temporary frame buffer to obtain the modified rendering command. Resolution of the temporary frame buffer is lower than the resolution of FB1. In some other embodiments, if the CPU determines that no frame buffer identifier consistent with the frame buffer identifier of FB1 exists in the stored frame buffer identifier, and determines that FB1 is not a primary frame buffer, the CPU directly sends the rendering command about FB1 to the GPU.

Rendering resolution of the primary frame buffer is relatively high, and correspondingly, a relatively large quantity of pixels are processed when a rendering operation is performed. Adjusting rendering processing in the primary frame buffer can reduce pressure on the electronic device that is caused by rendering processing, and can achieve a more significant effect than adjusting a rendering processing mechanism in another frame buffer in the image.

In this embodiment of this application, a processor of the electronic device may configure a temporary frame buffer for a primary frame buffer, and resolution of the temporary frame buffer is lower than resolution of the primary frame buffer. In this way, the electronic device performs a rendering operation on content (a geometric graphic) in the primary frame buffer by using relatively low resolution, and a relatively small quantity of pixels need to be processed in the rendering operation, so that computation power consumption of the electronic device in an image rendering process can be reduced, thereby reducing impact of high-resolution rendering on the electronic device, and effectively reducing heat of the electronic device.

In some embodiments of this application, the resolution of the temporary frame buffer configured for the primary frame buffer may be determined based on the resolution of the primary frame buffer. For example, resolution of a temporary frame buffer configured for FB1 is determined based on the resolution of FB1. For a method for obtaining the resolution of the primary frame buffer, refer to the foregoing description. Details are not described herein again.

In some embodiments of this application, a scaling parameter may be configured in the electronic device. The scaling parameter may be used to determine the resolution of the temporary frame buffer. For example, the processor may determine the resolution of the temporary frame buffer according to the following formula (1):

$$\text{Resolution of temporary frame buffer} = \text{Resolution of primary frame buffer} \times \text{Scaling parameter.} \quad \text{Formula (1):}$$

The scaling parameter may be a positive number less than 1. The scaling parameter may be configured by a user, may be preset in the electronic device, or may be obtained by the electronic device from a cloud when required.

After the resolution of the temporary frame buffer is determined, the CPU may configure storage space with a corresponding size in the memory for the temporary frame buffer. In some implementations, the processor may configure the temporary frame buffer by creating a temporary frame buffer object and binding the temporary frame buffer object to storage space configured in the memory. The temporary frame buffer object may be a name of the temporary frame buffer.

Figure 3:
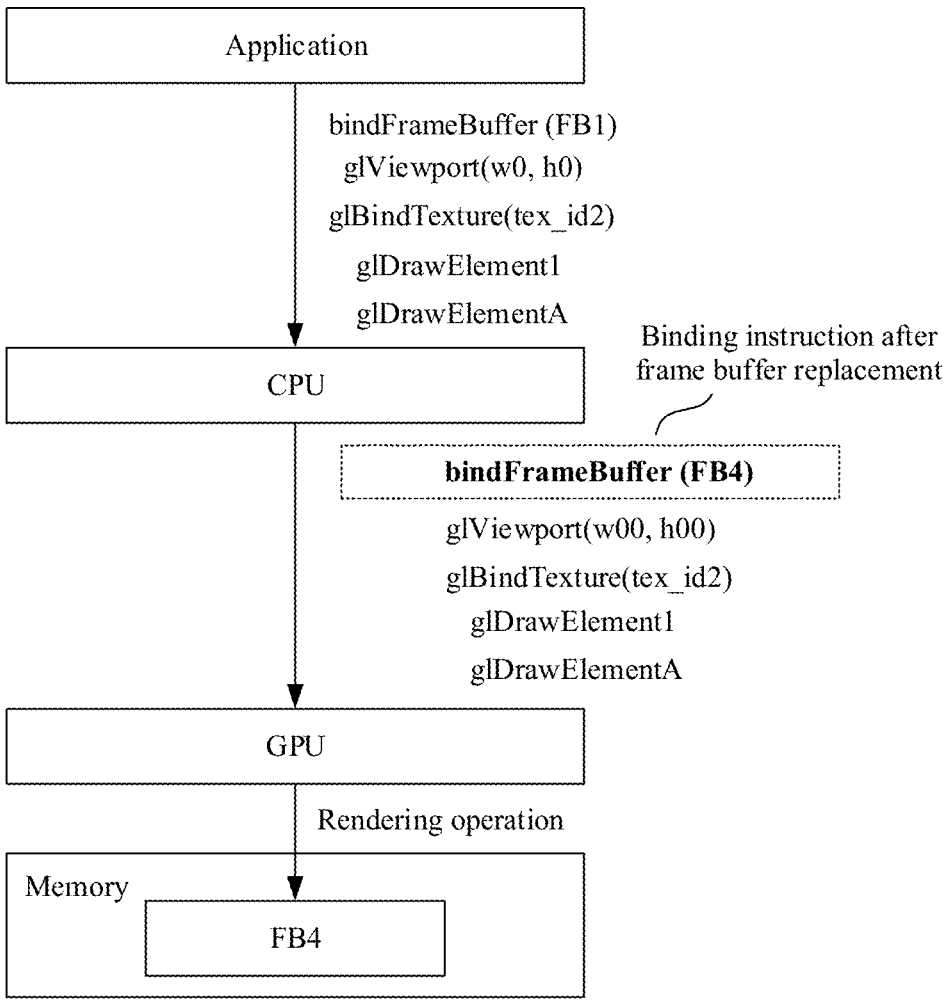
FIG. 3 is a schematic diagram of delivering a rendering command according to an embodiment of this application.

Referring to an example in FIG. 3, in a rendering process of FB1, a temporary frame buffer is FB4, the resolution of FB1 is (w0, h0), a texture expected to be drawn for FB1 is tex_id2, resolution of FB4 is (w00, h00), and a quantity of drawcall included in FB1 is 2 (for example, glDrawElement1 and glDrawElement2). The resolution of FB4 is lower than the resolution of FB1.

The rendering command about FB1 that is received by the CPU from the application includes the following instructions:

bindFrameBuffer (FB1);
    glViewport(w0, h0);
    glBindTexture(tex_id2);
    glDrawElement1;
    glDrawElement2.

In this example, the CPU may replace the identifier (for example, FB1) of the primary frame buffer with the identifier (for example, FB4) of the temporary frame buffer in the rendering command about FB1, to implement an operation of replacing the primary frame buffer with the temporary frame buffer, that is, an operation of replacing FB1 with FB4. For example, the CPU may replace bindFrameBuffer (FB1) with bindFrameBuffer (FB4). In this case, a rendering command obtained after replacement may be:

bindFrameBuffer (FB4);
    glViewport(w00, h00);
    glBindTexture(tex_id2);
    glDrawElement1;
    glDrawElement2.

To be specific, the CPU may replace a rendering operation originally bound to the primary frame buffer (for example, FB1) with a rendering operation bound to the temporary frame buffer, to obtain the modified rendering command.

212. The CPU sends the modified rendering command to the GPU.

After the CPU delivers the modified rendering command to the GPU, the GPU may implement, on the temporary frame buffer according to the modified rendering command, a rendering operation originally performed on FB1. For example, after FB1 is replaced with FB4, the GPU may perform rendering operations of glDrawElement1 and glDrawElement2 on FB4, and store a result in FB4.

Because the resolution of the temporary frame buffer (for example, FB4) is lower than the resolution of FB1, storage space occupied by the temporary frame buffer in the memory is smaller than storage space occupied by FB1 in the memory. Correspondingly, resolution of a rendering operation performed on the temporary frame buffer is lower, that is, when same rendering processing (for example, glDrawElement1 and glDrawElement2) is performed on the temporary frame buffer, a quantity of pixels that need to be processed is less than that in FB1. Therefore, power consumption required for performing the rendering operation on the temporary frame buffer is less than that required for performing the rendering operation on FB1, and less heat is generated, so that power consumption in an image processing process is reduced.

In some embodiments of this application, when performing the rendering operation corresponding to FB1 on the temporary frame buffer, the electronic device may use a multi-sampling technology. Multi-sampling can improve a display effect of low-resolution rendering, thereby further improving quality of an image displayed to the user.

For example, when delivering, to the GPU, the rendering command for performing the rendering operation in the temporary frame buffer, the CPU may indicate the GPU to process a graphical element (for example, a dot, a straight line, or a geometric graphic such as a polygon) by using more color, depth, and/or stencil information, to blur an image edge. In this way, when a result obtained after the rendering operation is performed in the temporary frame buffer is displayed, an image edge does not leave a sawtooth sense due to relatively low resolution. In this way, image quality can be improved.

213. Determine that no frame buffer identifier consistent with the frame buffer identifier of FB3 exists in the stored frame buffer identifier.

The application delivers a rendering command about FB3 to the CPU, and the rendering command about FB3 is used to render FB3. It should be understood that, before the application delivers the rendering command about FB3 to the CPU, the application may deliver a rendering command about FB2 to the CPU, and the rendering command about FB2 is used to render FB2. Because the resolution of FB2 is the same as the resolution of FB21, an execution process of the rendering command about FB2 is consistent with that of the rendering command about FB1. Therefore, details are not described herein again.

The CPU receives the rendering command about FB3, and the CPU determines whether a frame buffer identifier consistent with the frame buffer identifier of FB3 exists in the stored frame buffer identifier. After determining that no frame buffer identifier consistent with the frame buffer identifier of FB3 corresponding to the rendering command about FB3 exists in the stored frame buffer identifier, the CPU determines that FB3 is not a primary frame buffer. FB3 is not a primary frame buffer. Therefore, the CPU does not need to replace FB3 with a temporary frame buffer, and does not need to process the rendering command about FB3.

214. The CPU sends the rendering command about FB3 to the GPU.

After the GPU receives the rendering command about FB3, the GPU may perform, on FB3, a rendering operation corresponding to the rendering command about FB3, to complete rendering on FB3.

It should be noted that, in some embodiments, the electronic device may perform the foregoing solution for rendering operations of all primary frame buffers by using the CPU, for example, perform a rendering operation of a primary frame buffer by using a temporary frame buffer with lower resolution. In some other embodiments, the electronic device may perform the solution shown in FIG. 2A and FIG. 2B when power consumption control needs to be performed. For example, in a possible implementation, when load is greater than a preset threshold, the electronic device may determine that power consumption control needs to be performed. Therefore, the solution shown in FIG. 2A and FIG. 2B may be triggered to reduce power consumption in an image processing process.

It may be understood that the execution sequence shown in the foregoing embodiment is merely an example, and constitutes no limitation. Some steps in the embodiment may alternatively be omitted. For example, 204 in FIG. 2A and FIG. 2B may be performed before 201, may be performed between 201 and 202, or may be performed between 202 and 203.

In the solution provided in the foregoing embodiment, the CPU recognizes the received frame buffer resource creation command, and determines the quantity of color attachments of the frame buffer corresponding to the frame buffer resource creation command. Whether the quantity of color attachments of the frame buffer corresponding to the frame buffer resource creation command meets the preset quantity condition is determined. The primary frame buffer is determined based on the quantity of color attachments. For example, a frame buffer whose quantity of color attachments meets the preset quantity condition is determined as the primary frame buffer. When a frame buffer whose quantity of color attachments meets the preset quantity condition is recognized, first resolution corresponding to the frame buffer is determined, and a frame buffer identifier of the frame buffer is stored in the preset storage space. Subsequently, a newly received frame buffer resource creation command is directly recognized based on the first resolution corresponding to the frame buffer, whether a frame buffer corresponding to the newly received frame buffer resource creation command is a primary frame buffer is determined, and the primary frame buffer does not need to be determined based on the quantity of color attachments. If second resolution of a frame buffer corresponding to a frame buffer resource creation command is consistent with the first resolution, the frame buffer is determined as a primary frame buffer, and a frame buffer identifier of the frame buffer is stored in the preset storage space. If second resolution of a frame buffer corresponding to a frame buffer resource creation command is inconsistent with the first resolution, it is determined that the frame buffer is not a primary frame buffer. When receiving the rendering command, the CPU determines the frame buffer corresponding to the rendering command, and determines whether a frame buffer identifier consistent with the frame buffer identifier of the frame buffer corresponding to the rendering command exists in the frame buffer identifier stored in the preset storage space. If a frame buffer identifier consistent with the frame buffer identifier of the frame buffer exists in the stored frame buffer identifier, the CPU replaces the frame buffer with the temporary frame buffer to obtain the modified rendering command, and sends the modified rendering command to the GPU. If no frame buffer identifier consistent with the frame buffer identifier of the frame buffer exists in the stored frame buffer identifier, the CPU does not need to process the rendering command, but directly sends the rendering command to the GPU.

In the solution provided in the foregoing embodiment, before image rendering, the electronic device can determine, based on a quantity of color attachments in a frame buffer, a frame buffer (for example, referred to as a primary frame buffer) that consumes a relatively large quantity of rendering resources in an image. If it is determined that a quantity of color attachments in a frame buffer meets the preset quantity condition, a primary frame buffer is determined in other frame buffers based on resolution of the frame buffer. Subsequently, a primary frame buffer may be directly determined based on the resolution, and the primary frame buffer does not need to be determined based on a quantity of color attachments, so that computation in a recognition process can be reduced, and efficiency of determining the primary frame buffer can be improved. A frame buffer identifier of the determined primary frame buffer is stored in the preset storage space. When the rendering command is received, the frame buffer corresponding to the rendering command is determined. Whether a frame buffer identifier consistent with the frame buffer identifier of the frame buffer corresponding to the rendering command exists in the preset storage space is determined. If a frame buffer identifier consistent with the frame buffer identifier of the frame buffer exists in the preset storage space, the primary frame buffer is replaced with the temporary frame buffer. The resolution of the temporary frame buffer is lower than the resolution of the primary frame buffer, and a rendering operation corresponding to the primary frame buffer in the rendering command is performed on the temporary frame buffer. When rendering processing that is the same as that on the primary frame buffer is performed on the temporary frame buffer, a quantity of pixels that need to be processed is less than a quantity of pixels that need to be processed when rendering processing is performed on the primary frame buffer. Therefore, computation power resource consumption in the rendering operation on the primary frame buffer is reduced, so that computation power consumption of the electronic device in an image rendering process is reduced, and heat of the electronic device is reduced.

Figure 4A:
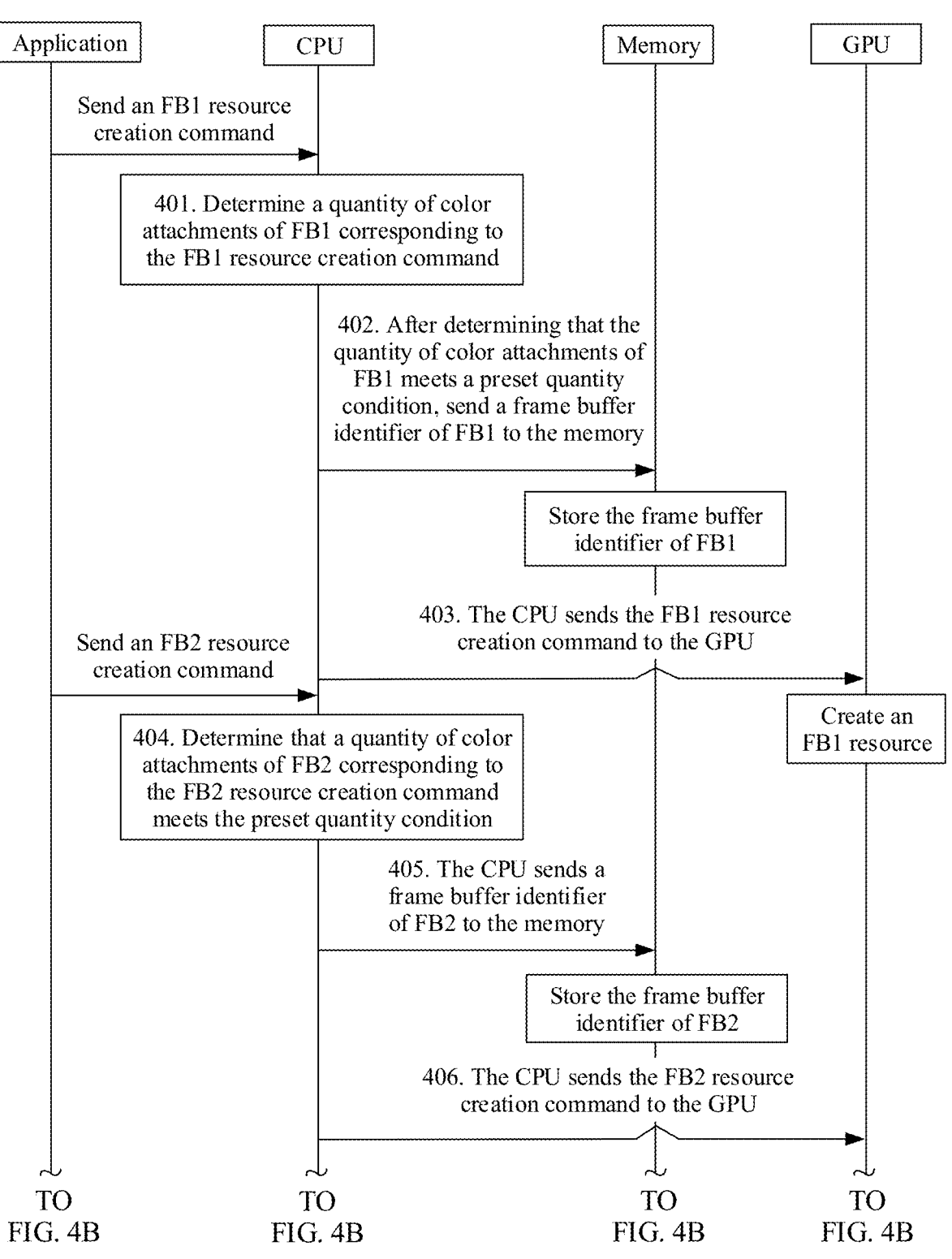
FIG. 4A and FIG. 4B are a flowchart of another image processing method according to an embodiment of this application.
Figure 4B:
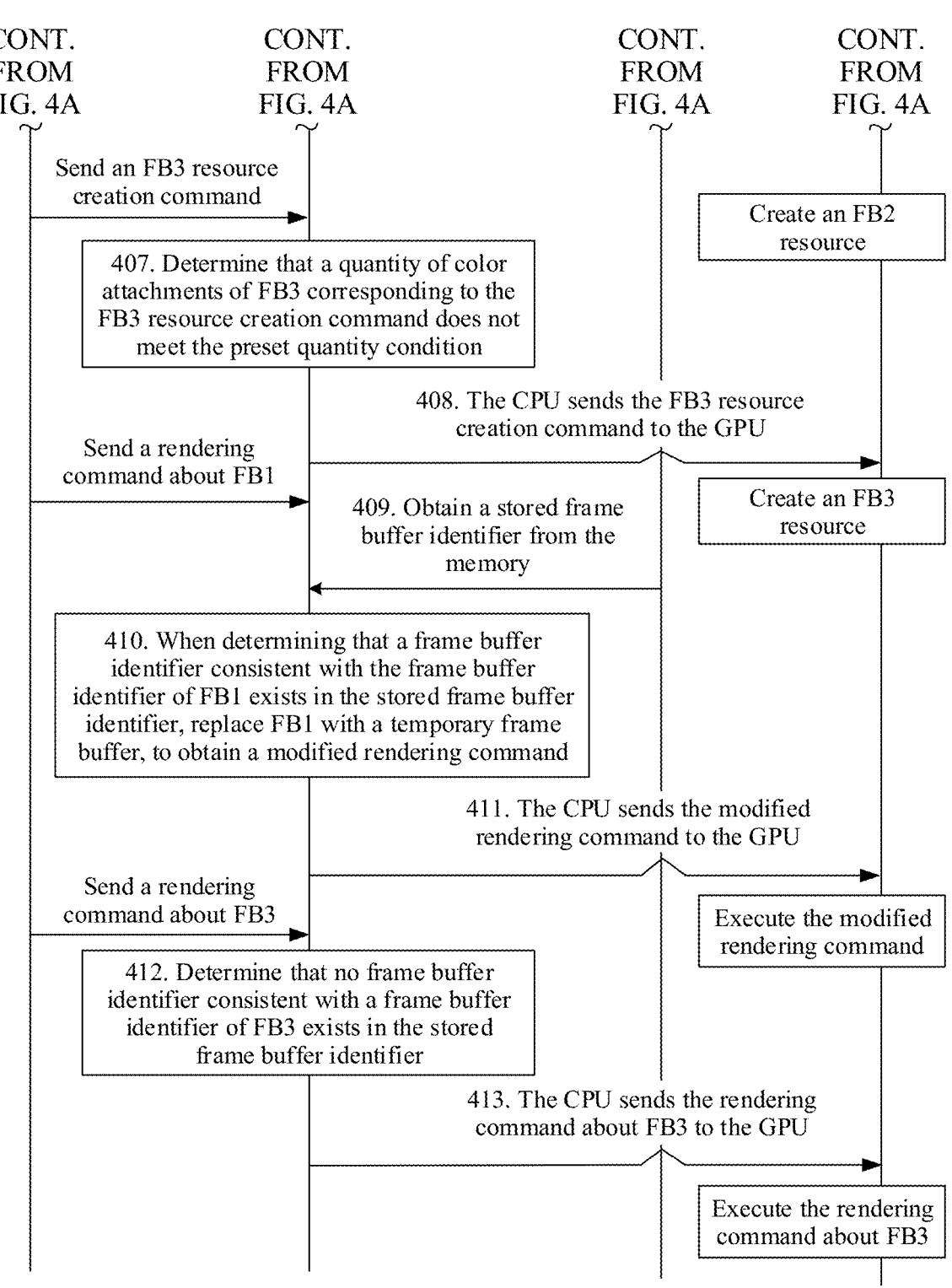

FIG. 4A and FIG. 4B are a flowchart of another image processing method according to an embodiment of this application. The method is applied to an electronic device, and the electronic device may include an application, a CPU, a GPU, and a memory. As shown in FIG. 4A and FIG. 4B, the method may include the following steps.

401. Determine a quantity of color attachments of FB1 corresponding to an FB1 resource creation command.

In an application loading process, the application delivers a frame buffer resource creation command (such as the FB1 resource creation command or an FB2 resource creation command) to the CPU.

402. After determining that the quantity of color attachments of FB1 meets a preset quantity condition, send a frame buffer identifier of FB1 to the memory.

The CPU determines whether the quantity of color attachments of FB1 meets the preset quantity condition. After it is determined that the quantity of color attachments of FB1 meets the preset quantity condition, FB1 is determined as a primary frame buffer, and the CPU sends the frame buffer identifier of FB1 to the memory.

For example, the quantity of color attachments of FB1 corresponding to the FB1 resource creation command is 3, the preset quantity condition is that a quantity of color attachments of a frame buffer is greater than a preset quantity threshold, and the preset quantity threshold is 2. The quantity of color attachments of FB1 is greater than the preset quantity threshold, and meets the preset quantity condition. FB1 is determined as a primary frame buffer, and the CPU sends the frame buffer identifier of FB1 to the memory.

403. The CPU sends the FB1 resource creation command to the GPU.

404. Determine that a quantity of color attachments of FB2 corresponding to an FB2 resource creation command meets the preset quantity condition.

The application sends the FB2 resource creation command to the CPU. After receiving the FB2 resource creation command, the CPU determines the quantity of color attachments of FB2 corresponding to the FB2 resource creation command. The CPU determines whether the quantity of color attachments of FB2 meets the preset quantity condition.

405. The CPU sends a frame buffer identifier of FB2 to the memory.

After it is determined that the quantity of color attachments of FB2 meets the preset quantity condition, FB2 is determined as a primary frame buffer, and the CPU sends the frame buffer identifier of FB2 to the memory.

For example, the quantity of color attachments of FB2 corresponding to the FB2 resource creation command is 4, and the preset quantity condition is that a quantity of color attachments of a frame buffer is greater than 2. The quantity of color attachments of FB2 is greater than 2, and meets the preset quantity condition. FB2 is determined as a primary frame buffer, and the CPU sends the frame buffer identifier of FB2 to the memory.

406. The CPU sends the FB2 resource creation command to the GPU.

407. Determine that a quantity of color attachments of FB3 corresponding to an FB3 resource creation command does not meet the preset quantity condition.

The application sends the FB3 resource creation command to the CPU. After receiving the FB3 resource creation command, the CPU determines the quantity of color attachments of FB3 corresponding to the FB3 resource creation command.

The CPU determines whether the quantity of color attachments of FB3 meets the preset quantity condition. After it is determined that the quantity of color attachments of FB3 does not meet the preset quantity condition, it is determined that FB3 is not a primary frame buffer, and a frame buffer identifier of FB3 does not need to be stored. For example, the quantity of color attachments of FB3 corresponding to the FB3 resource creation command is 2, and the preset quantity condition is that a quantity of color attachments of a frame buffer is greater than 2. The quantity of color attachments of FB3 is equal to 2, and does not meet the preset quantity condition. It is determined that FB3 is not a primary frame buffer, and the frame buffer identifier of FB3 does not need to be stored.

408. The CPU sends the FB3 resource creation command to the GPU.

409. Obtain a stored frame buffer identifier from the memory.

When the application needs to render an image, the application delivers a rendering command, such as a rendering command about FB1, to the CPU. The rendering command about FB1 is used to render FB1. When the CPU receives the rendering command, the CPU obtains the frame buffer identifier stored in the memory.

410. When determining that a frame buffer identifier consistent with the frame buffer identifier of FB1 exists in the stored frame buffer identifier, replace FB1 with a temporary frame buffer, to obtain a modified rendering command.

The CPU receives the rendering command about FB1, and the CPU determines whether a frame buffer identifier consistent with the frame buffer identifier of FB1 exists in the stored frame buffer identifier.

When determining that a frame buffer identifier consistent with the frame buffer identifier of FB1 exists in the stored frame buffer identifier, the CPU determines FB1 as a main scene. The CPU replaces FB1 with the temporary frame buffer to obtain the modified rendering command.

411. The CPU sends the modified rendering command to the GPU.

412. Determine that no frame buffer identifier consistent with the frame buffer identifier of FB3 exists in the stored frame buffer identifier.

The application delivers a rendering command about FB3 to the CPU, and the rendering command about FB3 is used to render FB3. It should be understood that, before the application delivers the rendering command about FB3 to the CPU, the application may deliver a rendering command about FB2 to the CPU, and the rendering command about FB2 is used to render FB2. An execution process of the rendering command about FB2 is consistent with that of the rendering command about FB1. Therefore, details are not described herein again.

The CPU receives the rendering command about FB3, and the CPU determines whether a frame buffer identifier consistent with the frame buffer identifier of FB3 exists in the stored frame buffer identifier.

After determining that no frame buffer identifier consistent with the frame buffer identifier of FB3 corresponding to the rendering command about FB3 exists in the stored frame buffer identifier memory, the CPU determines that FB3 is not a primary frame buffer. FB3 is not a primary frame buffer. Therefore, the CPU does not need to replace FB3 with a temporary frame buffer, and does not need to process the rendering command about FB3.

413. The CPU sends the rendering command about FB3 to the GPU.

For some specific implementations of 401-413, refer to related descriptions of 201-214 in FIG. 2A and FIG. 2B. Details are not described herein again.

It may be understood that the execution sequence shown in the foregoing embodiment is merely an example, and constitutes no limitation. Some steps in the embodiment may alternatively be omitted. For example, 403 in FIG. 4A and FIG. 4B may be performed before 401, or may be performed between 401 and 402.

In the solution provided in the foregoing embodiment, the CPU recognizes the received frame buffer resource creation command, and determines the quantity of color attachments of the frame buffer corresponding to the frame buffer resource creation command. Whether the quantity of color attachments of the frame buffer corresponding to the frame buffer resource creation command meets the preset quantity condition is determined. A frame buffer whose quantity of color attachments meets the preset quantity condition is determined as a primary frame buffer, and a frame buffer identifier corresponding to the frame buffer is stored in preset storage space. When receiving the rendering command, the CPU determines the frame buffer corresponding to the rendering command. Whether a frame buffer identifier consistent with the frame buffer identifier of the frame buffer corresponding to the rendering command exists in the preset storage space is determined. If a frame buffer identifier consistent with the frame buffer identifier of the frame buffer exists in the preset storage space, the frame buffer is replaced with the temporary frame buffer to obtain the modified rendering command, and the modified rendering command is sent to the GPU.

In the solution provided in the foregoing embodiment, before image rendering, the electronic device can determine, based on a quantity of color attachments in a frame buffer corresponding to a frame buffer resource creation command, a frame buffer (for example, referred to as a primary frame buffer) that consumes a relatively large quantity of rendering resources in an image, and a frame buffer identifier corresponding to the primary frame buffer is stored in the preset storage space. When the rendering command is received, the frame buffer corresponding to the rendering command is determined. Whether a frame buffer identifier consistent with the frame buffer identifier of the frame buffer corresponding to the rendering command exists in the preset storage space is determined. If a frame buffer identifier consistent with the frame buffer identifier of the frame buffer exists in the preset storage space, the primary frame buffer is replaced with a second frame buffer. Resolution of the second frame buffer is lower than the resolution of the primary frame buffer, and a rendering operation corresponding to the primary frame buffer in the rendering command is performed on the second frame buffer. When rendering processing that is the same as that on the primary frame buffer is performed on the second frame buffer, a quantity of pixels that need to be processed is less than a quantity of pixels that need to be processed when rendering processing is performed on the primary frame buffer. Therefore, computation power resource consumption in the rendering operation on the primary frame buffer is reduced, so that computation power consumption of the electronic device in an image rendering process is reduced, and heat of the electronic device is reduced.

Figure 5:
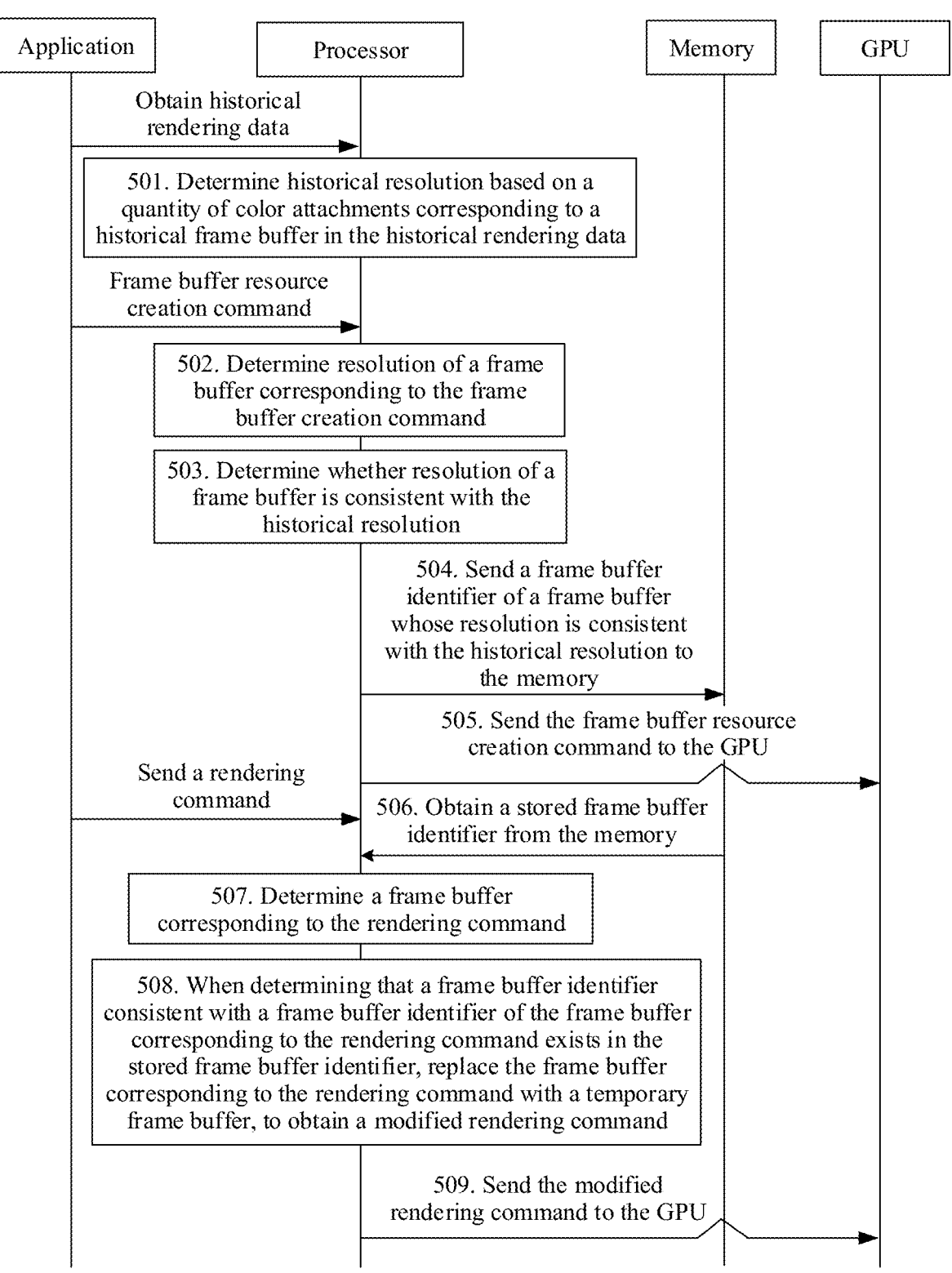
FIG. 5 is a flowchart of an image processing method based on historical rendering data according to an embodiment of this application.

FIG. 5 is a flowchart of an image processing method based on historical rendering data according to an embodiment of this application. The method is applied to an electronic device, and the electronic device may include an application, a CPU, a GPU, and a memory. As shown in FIG. 5, the method may include the following steps.

501. Determine historical resolution based on a quantity of color attachments corresponding to a historical frame buffer in the historical rendering data.

A processor obtains the historical rendering data from the application. For example, the processor may obtain the historical rendering data of the application from the application by using an existing disclosed graphics analysis tool (such as MGD, AGA, or RenderDoc).

A primary frame buffer may be a frame buffer in which a rendering task is relatively heavy, rendering resolution is relatively high, and a quantity of performed rendering operations is relatively large in a rendering process. Historical resolution corresponding to a historical primary frame buffer may be determined in the historical frame buffer based on the quantity of color attachments of the historical frame buffer in the historical rendering data. The historical resolution is used to recognize the primary frame buffer in a frame buffer resource creation command. For example, if resolution corresponding to a frame buffer in the frame buffer resource creation command is the same as the historical resolution, the frame buffer is determined as the primary frame buffer.

A historical frame buffer whose quantity of color attachments meets a preset quantity condition may be determined as the historical primary frame buffer.

A historical frame buffer (FB) in the historical rendering data is analyzed. If a quantity of color attachments of a historical FB meets the preset quantity condition, it is considered that the historical FB is the historical primary frame buffer, and resolution corresponding to the historical FB is determined as the historical resolution. The preset quantity condition may be set according to an actual situation. This is not limited herein.

For example, a historical frame buffer in the historical rendering data is FB1. A quantity of color attachments of FB1 is 3, the preset quantity condition is that a quantity of color attachments of a frame buffer is greater than a preset quantity threshold, and the preset quantity threshold is 2. The quantity of color attachments of FB1 is greater than 2. If the quantity of color attachments of FB1 meets the preset quantity condition, FB1 is determined as the historical primary frame buffer, and resolution (such as 1280×606) of FB1 is determined as the historical resolution.

In some implementations, resolution corresponding to a frame buffer may be determined by recognizing a glView-Port(x, y) function corresponding to the frame buffer. For example, the resolution corresponding to FB1 is determined according to a glViewPort(x, y) function corresponding to FB1. The glViewPort(x, y) function is used to specify a size of a drawn image when a rendering operation is performed in the frame buffer. A value of (x, y) is determined based on the resolution of the frame buffer. This indicates that a rendering operation is performed in an x×y pixel area. The resolution corresponding to the frame buffer may be determined based on values of x and y in the glViewPort(x, y) function. In some other implementations, resolution of a frame buffer may be determined by performing a glGetInt-egerv function on the frame buffer. For example, the resolution of FB1 is determined by performing the glGetIntegerv function on FB1.

502. Determine resolution of a frame buffer corresponding to the frame buffer creation command.

For some specific implementations of determining the resolution of the frame buffer, refer to the foregoing description. Details are not described herein again.

503. Determine whether resolution of a frame buffer is consistent with the historical resolution.

If resolution of a frame buffer in the frame buffer corresponding to the frame buffer resource creation command is the same as the historical resolution, the frame buffer is determined as a primary frame buffer. If no resolution of a frame buffer in the frame buffer corresponding to the frame buffer resource creation command is the same as the historical resolution, it is determined that no primary frame buffer exists in the frame buffer corresponding to the frame buffer resource creation command.

504. Send a frame buffer identifier of a frame buffer whose resolution is consistent with the historical resolution to the memory.

505. Send the frame buffer resource creation command to the GPU.

The CPU sends the frame buffer resource creation command to the GPU.

506. Obtain a stored frame buffer identifier from the memory.

The processor obtains the stored frame buffer identifier from the memory.

507. Determine a frame buffer corresponding to a rendering command.

When the application needs to render an image, the application delivers a rendering command, such as a rendering command about FB1, to the CPU. Each rendering command may correspond to one frame buffer.

508. When determining that a frame buffer identifier consistent with a frame buffer identifier of the frame buffer corresponding to the rendering command exists in the stored frame buffer identifier, replace the frame buffer corresponding to the rendering command with a temporary frame buffer, to obtain a modified rendering command.

509. Send the modified rendering command to the GPU.

For some specific implementations of 501-509, refer to related descriptions of 201-214 in FIG. 2A and FIG. 2B. Details are not described herein again.

It may be understood that the execution sequence shown in the foregoing embodiment is merely an example, and constitutes no limitation. Some steps in the embodiment may alternatively be omitted. For example, 505 in FIG. 5 may be performed between 501 and 502, or may be performed between 502 and 503.

In the solution provided in the foregoing embodiment, the electronic device can determine the historical resolution based on the quantity of color attachments corresponding to the historical frame buffer in the historical rendering data, and the historical resolution is used to determine, before a frame buffer is rendered, a frame buffer (for example, referred to as a primary frame buffer) that consumes a relatively large quantity of rendering resources. The primary frame buffer is determined in the frame buffer corresponding to the frame buffer resource creation command based on the historical resolution, and the frame buffer identifier corresponding to the primary frame buffer is stored in the preset storage space. Then, in an image rendering process, when the rendering command is received, the frame buffer corresponding to the rendering command is determined. Whether a frame buffer identifier consistent with the frame buffer identifier of the frame buffer corresponding to the rendering command exists in the preset storage space is determined. If a frame buffer identifier consistent with the frame buffer identifier of the frame buffer exists in the preset storage space, the frame buffer is replaced with the temporary frame buffer, and rendering processing that is the same as that on the primary frame buffer is performed on the temporary frame buffer. Resolution of the temporary frame buffer is lower than resolution of the primary frame buffer. When rendering processing that is the same as that on the primary frame buffer is performed on the temporary frame buffer, a quantity of pixels that need to be processed is less than a quantity of pixels that need to be processed when rendering processing is performed on the primary frame buffer. Therefore, computation power resource consumption in the rendering operation on the primary frame buffer is reduced, so that computation power consumption of the electronic device in an image rendering process is reduced, and heat of the electronic device is reduced.

FIG. 6 is a block diagram of a software structure of an electronic device according to an embodiment of this application. As shown in FIG. 6, the electronic device may include an application layer 601, a framework layer 602, a system library 603, a hardware layer 604, and the like.

The application layer 601 may also be referred to as an application program layer, or an application (application, APP) layer. In some implementations, the application layer may include a series of application packages. The application packages may include applications such as Camera, Gallery, Calendar, Phone, Map, Navigation, WLAN, Bluetooth, Music, Videos, and Messages. The application packages may further include an application that needs to display a picture or a video to a user by rendering an image. For example, an application included in the application layer 601 may be a game-type application, for example, Genshin Impact®, Game For Peace®, or Arena Of Valor®.

The framework layer 602 may also be referred to as an application framework layer. The framework layer 602 may provide an application programming interface (application programming interface, API) and a programming framework for an application at the application layer 601. The framework layer 602 includes some predefined functions.

For example, the framework layer 602 may include a window manager, a content provider, a view system, a resource manager, a notification manager, an activity manager, an input manager, and the like. The window manager provides a window manager service (Window Manager Service, WMS), and the WMS may be used for window management, window animation management, and surface management, and serve as a transfer station of an input system. The content provider is configured to store and obtain data and make the data accessible to the application. The data may include videos, images, audio, calls that are made and received, browsing history and bookmarks, a phone book, and the like. The view system includes visual controls, such as a text display control and a picture display control. The view system may be configured to construct an application. A display interface may include one or more views. For example, a display interface including an SMS notification icon may include a text display view and a picture display view. The resource manager provides various resources for the application, such as a localized string, an icon, a picture, a layout file, and a video file. The notification manager enables the application to display notification information in a status bar, and may be configured to transfer a message of a notification type. The information may automatically disappear after a short stay without user interaction. For example, the notification manager is configured to notify a download completion, a message reminder, and the like. The notification manager may alternatively be a notification that appears in a form of a graph or a scroll bar text in a status bar at the top of the system, for example, a notification of an application running in the background, or may be a notification that appears in a form of a dialog window on a screen. For example, the status bar shows text information, a prompt tone is made, the electronic device vibrates, and an indicator flickers. The activity manager may provide an activity manager service (Activity Manager Service, AMS), and the AMS may be used to start, switch, and schedule system components (such as an activity, a service, a content provider, and a broadcast receiver), and manage and schedule application processes. The input manager may provide an input manager service (Input Manager Service, IMS), and the IMS may be used to manage system input, for example, touchscreen input, button input, and sensor input. The IMS obtains an event from an input device node, and assigns the event to an appropriate window through interaction with the WMS.

In this embodiment of this application, one or more function modules may be disposed at the framework layer 602, to implement the rendering solution provided in embodiments of this application. For example, an interception module, a recognition module, a decision module, and a replacement module may be disposed at the framework layer 602. In a subsequent example, functions of the foregoing modules are described in detail.

The system library 603 may include a plurality of function modules, for example, a surface manager (surface manager), a media framework (Media Framework), a standard C library (Standard C library, libc), an open graphics library for an embedded system (OpenGL for Embedded Systems, OpenGL ES), Vulkan, SQLite, and Webkit.

The surface manager is configured to manage a display subsystem and provide fusion of 2D and 3D layers for a plurality of applications. The media framework supports playback and recording in a plurality of commonly used audio and video formats, and static image files. The media library may support a plurality of audio and video coding formats, for example, moving picture experts group 4 (Moving Pictures Experts Group, MPEG-4), H.264, moving picture experts group audio layer 3 (Moving Picture Experts Group Audio Layer 3, MP3), advanced audio coding (Advanced Audio Coding, AAC), adaptive multi-rate (Adaptive Multi-Rate, AMR), joint photographic experts group (Joint Photographic Experts Group, JPEG or JPG), and portable network graphics (Portable Network Graphics, PNG). OpenGL ES and/or Vulkan provide/provides drawing and operation of 2D and 3D graphics in an application. SQLite provides a lightweight relational database for an application of the electronic device. In some implementations, OpenGL in the system library 603 provides a rendering function, and a to-be-displayed image may be rendered according to a rendering command delivered by an application.

In the example in FIG. 5, the electronic device may further include the hardware layer 604. The hardware layer 604 may include a processor, such as a central processing unit (Central Processing Unit/Processor, CPU) and a graphics processing unit (graphics processing unit, GPU). In some implementations, the CPU may be configured to control each module at the framework layer 602 to implement a function of the module, and the GPU may be configured to perform corresponding rendering processing according to an API in a graphics library (such as OpenGL ES) that is invoked by an instruction processed by each module at the framework layer 602.

Figure 7:
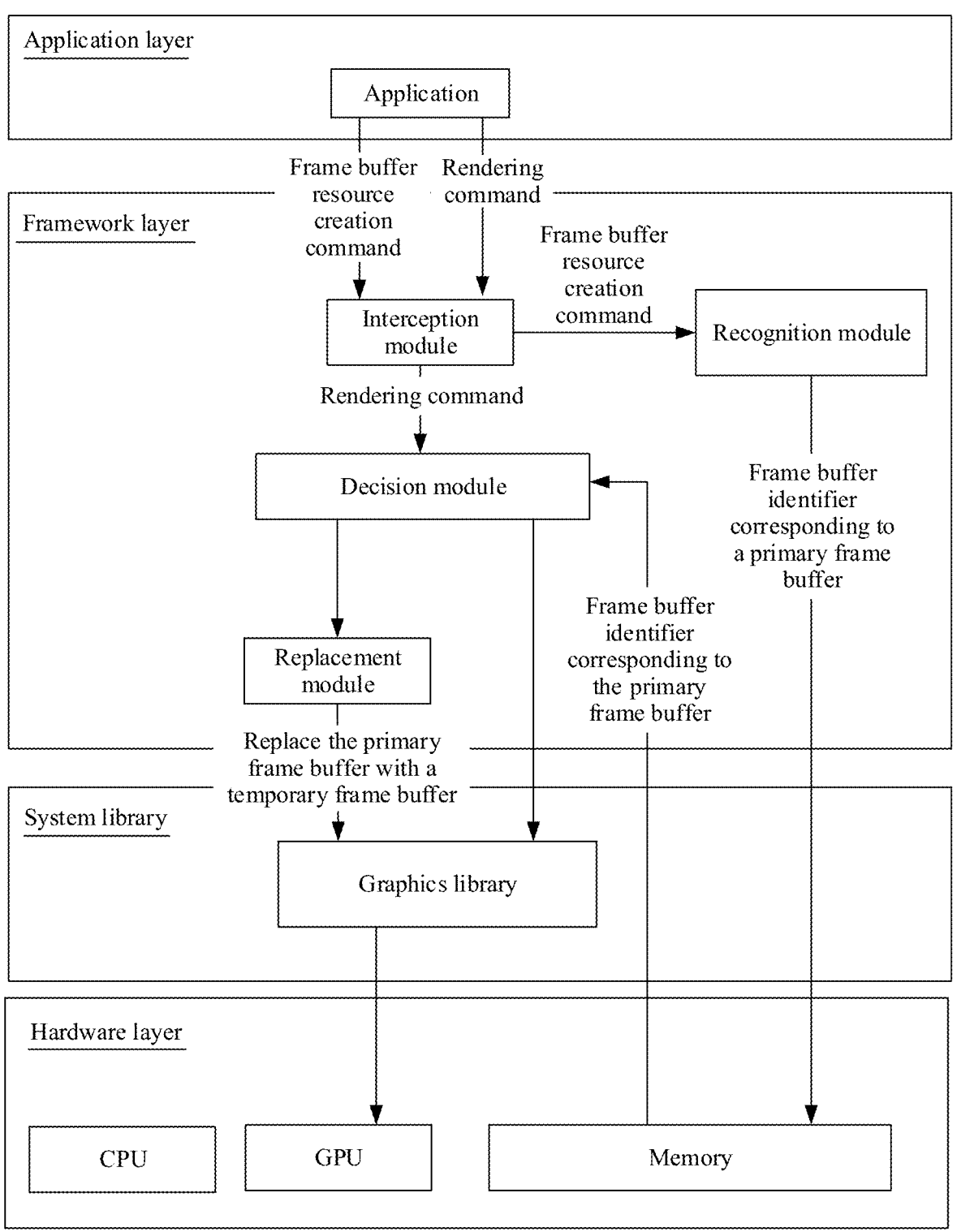
FIG. 7 is a schematic flowchart of an image processing method according to an embodiment of this application.

FIG. 7 is a schematic flowchart of image processing according to an embodiment of this application. As shown in FIG. 7, in a loading process of an application at an application layer, the application delivers a frame buffer resource creation command, and the frame buffer resource creation command is used to create a frame buffer corresponding to an image, to prepare for subsequent image rendering. An interception module at a frame layer intercepts the frame buffer resource creation command, and sends the frame buffer resource creation command to a recognition module at the frame layer. The recognition module determines a primary frame buffer in the frame buffer corresponding to the frame buffer resource creation command according to the received frame buffer resource creation command, and sends a frame buffer identifier corresponding to the determined primary frame buffer to a memory at a hardware layer. The application at the application layer may deliver a rendering command when the application needs to render an image. The interception module intercepts the rendering command, and sends the rendering command to a decision module at the frame layer. The decision module determines, by invoking the frame buffer identifier corresponding to the primary frame buffer in the memory, whether there is a primary frame buffer in a frame buffer corresponding to the rendering command. If the decision module determines the primary frame buffer in the frame buffer corresponding to the rendering command, the decision module sends the determined primary frame buffer to a replacement module at the frame layer. The replacement module modifies the rendering command, replaces the primary frame buffer with a temporary frame buffer, and sends a modified rendering command to a graphics library of a system library. Finally, image rendering is implemented based on the graphics library and a GPU at the hardware layer. A CPU at the hardware layer may be configured to control each module (the interception module, the recognition module, the decision module, or the replacement module) at the framework layer to implement a function of the module.

It should be noted that division into the modules in the foregoing embodiment is an example, and is merely logical function division. In actual implementation, there may be another division manner.

Figure 8A:
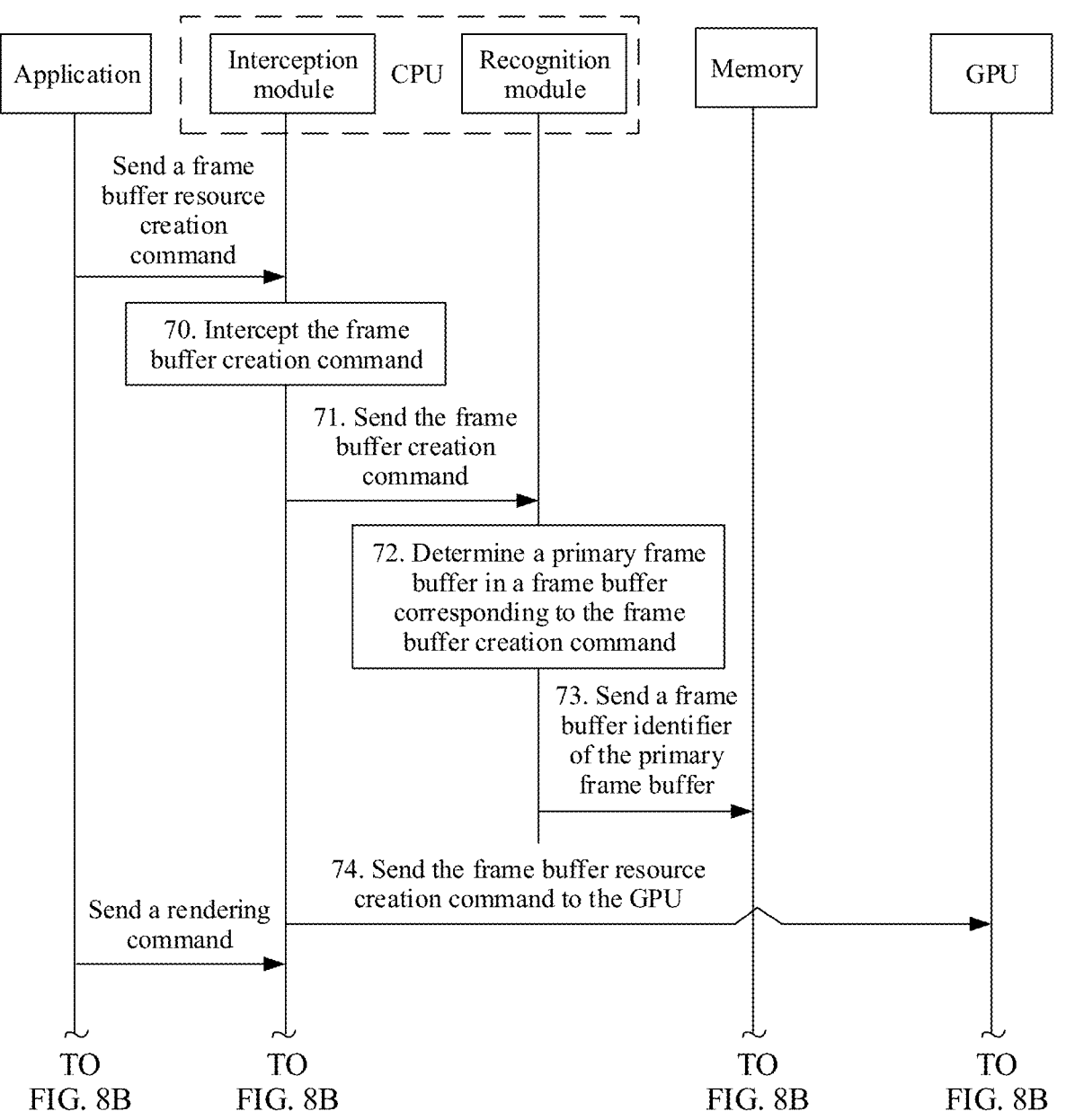

FIG. 8A and FIG. 8B are a flowchart of an image processing method according to an embodiment of this application. The image processing method is applied to an electronic device. The electronic device includes an application, an interception module, a recognition module, a decision module, a replacement module, a CPU, a GPU, and a memory. The interception module, the recognition module, the decision module, and the replacement module are modules controlled by the CPU, and may be modules in the CPU. As shown in FIG. 8A and FIG. 8B, the method includes the following steps.

701. Intercept a frame buffer creation command.

The interception module intercepts the frame buffer resource creation command sent by the application to the CPU.

702. Send the frame buffer creation command.

The interception module sends the intercepted frame buffer resource creation command to the recognition module.

703. Determine a primary frame buffer in a frame buffer corresponding to the frame buffer creation command.

The recognition module determines the primary frame buffer in the frame buffer corresponding to the frame buffer resource creation command.

704. Send a frame buffer identifier of the primary frame buffer.

The recognition module sends the frame buffer identifier corresponding to the determined primary frame buffer to the memory.

705. Send the frame buffer resource creation command to the GPU.

The interception module sends the frame buffer resource creation command to the GPU. It may be understood that the CPU may alternatively control another module to send the frame buffer resource creation command to the GPU, for example, control the recognition module to send the frame buffer resource creation command to the GPU.

706. Intercept a rendering command.

The interception module intercepts the rendering command delivered by the application.

707. Send the rendering command.

The interception module sends the intercepted rendering command to the decision module.

708. Obtain a stored frame buffer identifier from the memory.

The decision module obtains the stored frame buffer identifier from the memory.

709. Determine that a frame buffer identifier consistent with a frame buffer identifier of a frame buffer corresponding to the rendering command exists in the stored frame buffer identifier.

710. Send the rendering command.

After the decision module determines that a frame buffer identifier consistent with the frame buffer identifier of the frame buffer exists in the stored frame buffer identifier, the decision module determines that the frame buffer corresponding to the rendering command is a primary frame buffer, and sends the rendering command to the replacement module.

If it is determined that no frame buffer identifier consistent with the frame buffer identifier of the frame buffer exists in the stored frame buffer identifier, the decision module determines that the frame buffer corresponding to the rendering command is a primary frame buffer, and sends the rendering command to the replacement module.

711. Replace the frame buffer corresponding to the rendering command with a temporary frame buffer.

The replacement module replaces the frame buffer corresponding to the rendering command with the temporary frame buffer, to obtain a modified rendering command. Resolution of the temporary frame buffer is lower than resolution of the primary frame buffer. The replacement module sends the modified rendering command to the GPU, so that the GPU implements rendering based on the modified rendering command.

For specific implementations of 701-711, refer to related descriptions of 201-214 in FIG. 2A and FIG. 2B and related descriptions of 401-413 in FIG. 4A and FIG. 4B. Details are not described herein again. It may be understood that the execution sequence shown in the foregoing embodiment is merely an example, and constitutes no limitation. Some steps in the embodiment may alternatively be omitted.

Figure 9:
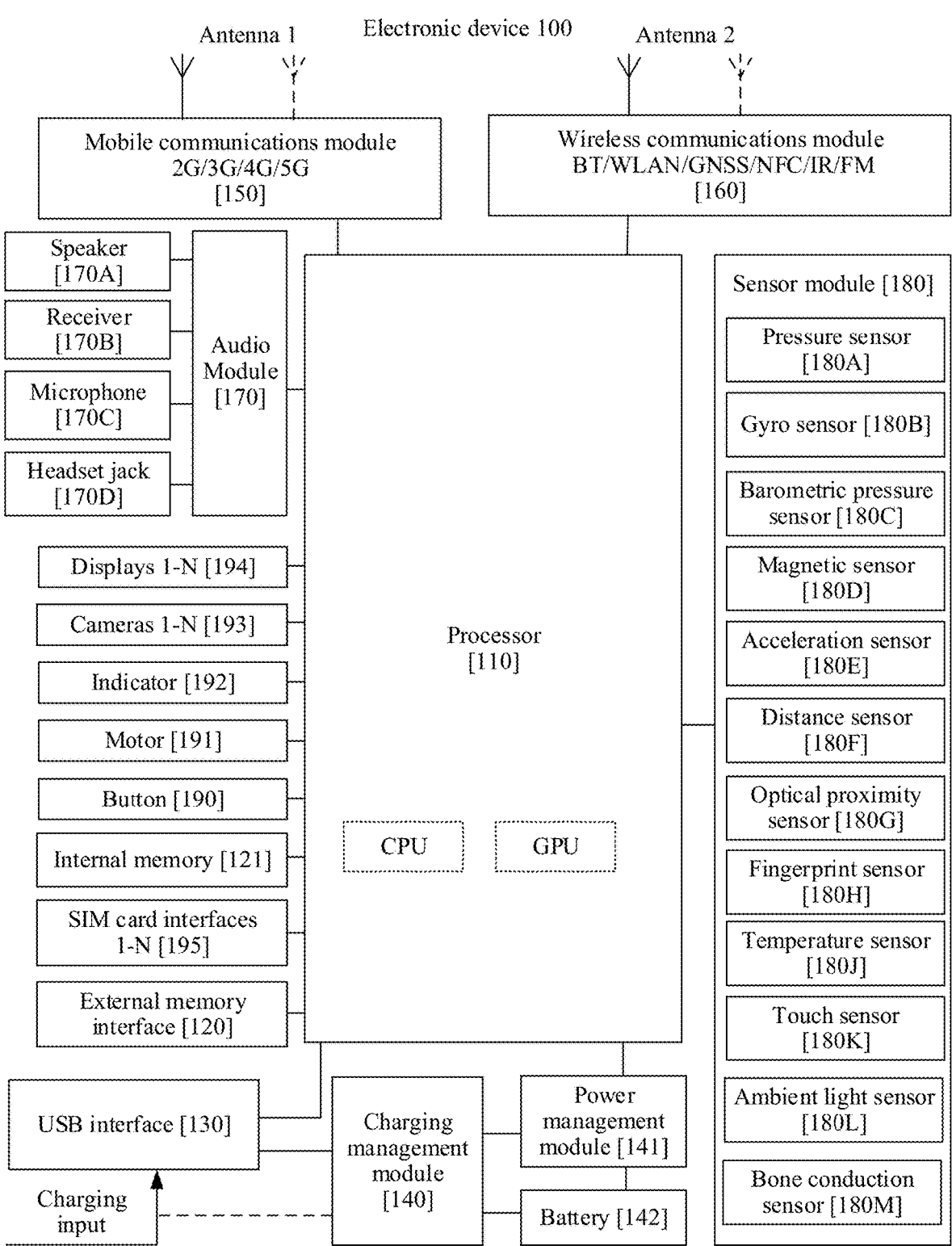
FIG. 9 is a schematic diagram of a structure of an electronic device according to an embodiment of this application.

FIG. 9 is a schematic diagram of a structure of an electronic device 100 according to an embodiment of this application. Referring to FIG. 9, the electronic device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (subscriber identification module, SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment of the present invention does not constitute a specific limitation on the electronic device 100. In some other embodiments of this application, the electronic device 100 may include more or fewer components than those shown in the figure, or combine some components, or split some components, or have different component arrangements. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, and/or a neural-network processing unit (neural-network processing unit, NPU). Different processing units may be independent components, or may be integrated into one or more processors. In this embodiment of this application, the GPU may implement rendering of an image, that is, implement rendering of a frame buffer.

The controller may generate an operation control signal based on instruction operation code and a time sequence signal, to complete control of instruction fetching and instruction execution.

A memory may further be disposed in the processor 110, to store instructions and data. In some embodiments, the memory in the processor 110 is a cache. The memory may store instructions or data just used or cyclically used by the processor 110. If the processor 110 needs to use the instructions or data again, the instructions or data may be directly invoked from the memory. This avoids repeated access, and reduces waiting time of the processor 110, so that system efficiency is improved.

In some embodiments, the processor 110 may include one or more interfaces. The interface may include an inter-integrated circuit (inter-integrated circuit, I1C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

The I1C interface is a two-way synchronous serial bus, and includes a serial data line (serial data line, SDA) and a serial clock line (derail clock line, SCL). The I2S interface may be used for audio communication. In some embodiments, the processor 110 may include a plurality of groups of I2S buses. The processor 110 may be coupled to the audio module 170 by using the I2S bus, to implement communication between the processor 110 and the audio module 170.

The PCM interface may be configured to perform audio communication, and sample, quantize, and code analog signals. In some embodiments, the audio module 170 may be coupled to the wireless communications module 160 by using a PCM bus interface.

The UART interface is a universal serial data bus, and is used for asynchronous communication. The bus may be a two-way communications bus. The bus converts to-be-transmitted data between serial communication and parallel communication. In some embodiments, the UART interface is usually configured to connect the processor 110 to the wireless communications module 160. For example, the processor 110 communicates with a Bluetooth module in the wireless communications module 160 by using the UART interface, to implement a Bluetooth function. In some embodiments, the audio module 170 may transmit an audio signal to the wireless communications module 160 through the UART interface, to implement a function of playing music by using a Bluetooth headset.

The MIPI interface may be configured to connect the processor 110 to a peripheral component such as the display 194 or the camera 193. The MIPI interface includes a camera serial interface (camera serial interface, CSI), a display serial interface (display serial interface, DSI), and the like. In some embodiments, the processor 110 and the camera 193 communicate with each other by using the CSI interface, to implement a photographing function of the electronic device 100. The processor 110 communicates with the display 194 by using the DSI interface, to implement a display function of the electronic device 100.

The GPIO interface may be configured by using software. The GPIO interface may be configured as a control signal, or may be configured as a data signal. In some embodiments, the GPIO interface may be configured to connect the processor 110 to the camera 193, the display 194, the wireless communications module 160, the audio module 170, the sensor module 180, and the like. The GPIO interface may alternatively be configured as the I1C interface, the I2S interface, the UART interface, the MIPI interface, or the like.

The USB interface 130 is an interface conforming to a USB standard specification, and may be specifically a mini USB interface, a micro USB interface, a USB Type-C interface, or the like. The USB interface 130 may be configured to connect to a charger to charge the electronic device 100, or may be configured to transmit data between the electronic device 100 and a peripheral device, or may be configured to connect to a headset to play audio by using the headset. The interface may alternatively be configured to connect to another electronic device 100, such as an AR device.

It may be understood that the interface connection relationship between the modules shown in this embodiment of the present invention is merely an example, and does not constitute a limitation on the structure of the electronic device 100. In other embodiments of this application, the electronic device 100 may alternatively use an interface connection manner that is different from the manner in the foregoing embodiment, or a combination of a plurality of interface connection manners.

The charging management module 140 is configured to receive charging input from a charger. The charger may be a wireless charger, or may be a wired charger. In some wired charging embodiments, the charging management module 140 may receive charging input of a wired charger through the USB interface 130. In some wireless charging embodiments, the charging management module 140 may receive wireless charging input through a wireless charging coil of the electronic device 100. When charging the battery 142, the charging management module 140 may further supply power to the electronic device 100 through the power management module 141.

The power management module 141 is configured to connect the battery 142, the charging management module 140, and the processor 110. The power management module 141 receives input of the battery 142 and/or the charging management module 140, and supplies power to the processor 110, the internal memory 121, the display 194, the camera 193, the wireless communications module 160, and the like. The power management module 141 may be further configured to monitor parameters such as a battery capacity, a battery cycle count, and a battery health status (leakage or impedance). In some other embodiments, the power management module 141 may alternatively be disposed in the processor 110. In some other embodiments, the power management module 141 and the charging management module 140 may also be disposed in a same component.

A wireless communication function of the electronic device 100 may be implemented by using the antenna 1, the antenna 2, the mobile communications module 150, the wireless communications module 160, the modem processor, the baseband processor, and the like.

The antenna 1 and the antenna 2 are configured to transmit and receive electromagnetic wave signals. Each antenna in the electronic device 100 may be configured to cover one or more communication bands. Different antennas may be multiplexed to improve antenna utilization. For example, the antenna 1 may be multiplexed into a diversity antenna of a wireless local area network. In some other embodiments, the antenna may be used in combination with a tuning switch.

The mobile communications module 150 may provide a solution for wireless communication, including 2G/3G/4G/5G and the like, that is applied to the electronic device 100. The mobile communications module 150 may include at least one filter, a switch, a power amplifier, a low noise amplifier (low noise amplifier, LNA), and the like. The mobile communications module 150 may receive an electromagnetic wave by using the antenna 1, perform processing such as filtering and amplification on the received electromagnetic wave, and send a processed electromagnetic wave to the modem processor for demodulation. The mobile communications module 150 may further amplify a signal modulated by the modem processor, and convert the signal into an electromagnetic wave for radiation through the antenna 1. In some embodiments, at least some function modules of the mobile communications module 150 may be disposed in the processor 110. In some embodiments, at least some function modules of the mobile communications module 150 may be disposed in a same component as at least some modules of the processor 110.

The modem processor may include a modulator and a demodulator. The modulator is configured to adjust a to-be-sent low-frequency baseband signal to a medium/high-frequency signal. The demodulator is configured to demodulate a received electromagnetic wave signal into a low-frequency baseband signal. Then, the demodulator transmits the low-frequency baseband signal obtained through demodulation to the baseband processor for processing. After being processed by the baseband processor, the low-frequency baseband signal is transmitted to the application processor. The application processor outputs a sound signal by using an audio device (which is not limited to the speaker 170A, the receiver 170B, or the like), or displays an image or a video by using the display 194. In some embodiments, the modem processor may be an independent device. In some other embodiments, the modem processor may be independent of the processor 110 and disposed in a same device as the mobile communications module 150 or another function modules.

The wireless communications module 160 may provide a solution for wireless communication that is applied to the electronic device 100 and that includes a wireless local area network (wireless local area networks, WLAN), Bluetooth (bluetooth, BT), a global navigation satellite system (global navigation satellite system, GNSS), frequency modulation (frequency modulation, FM), near field communication (near field communication, NFC), an infrared (infrared, IR) technology, and the like. The wireless communications module 160 may be one or more components that integrate at least one communications processing module. The wireless communications module 160 receives an electromagnetic wave through the antenna 2, performs frequency modulation and filtering on an electromagnetic wave signal, and sends a processed signal to the processor 110. The wireless communications module 160 may further receive a to-be-sent signal from the processor 110, perform frequency modulation and amplification on the to-be-sent signal, and convert the to-be-sent signal into an electromagnetic wave for radiation through the antenna 2.

In some embodiments, in the electronic device 100, the antenna 1 is coupled to the mobile communications module 150, and the antenna 2 is coupled to the wireless communications module 160, so that the electronic device 100 can communicate with a network and another device according to a wireless communications technology. The wireless communications technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, GNSS, WLAN, NFC, FM, an IR technology, and/or the like. The GNSS may include a global positioning system (global positioning system, GPS), a global navigation satellite system (global navigation satellite system, GLONASS), a BeiDou navigation satellite system (BeiDou navigation satellite system, BDS), a quasi-zenith satellite system (quasi-zenith satellite system, QZSS), and/or a satellite based augmentation system (satellite based augmentation systems, SBAS).

The electronic device 100 implements a display function by using the GPU, the display 194, the application processor, and the like. The GPU is a microprocessor for image processing, and is connected to the display 194 and the application processor. The GPU is configured to perform mathematical and geometric calculation and render graphics. The processor 110 may include one or more GPUs that execute program instructions to generate or change display information.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light-emitting diode (active-matrix organic light-emitting diode, AMOLED), a flexible light-emitting diode (flexible light-emitting diode, FLED), a mini-LED, a micro-LED, a micro-OLED, a quantum dot light-emitting diode (quantum dot light-emitting diodes, QLED), or the like.

In some embodiments, the electronic device 100 may include one or N displays 194, where N is a positive integer greater than 1. The electronic device 100 may implement a photographing function by using the ISP, the camera 193, the video codec, the GPU, the display 194, the application processor, and the like.

The camera 193 is configured to capture a still image or a video. An optical image of an object is generated by using a lens and projected onto a photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP for conversion into a digital image signal. The ISP outputs the digital image signal to the DSP for processing. The DSP converts the digital image signal into a standard image signal in a format such as RGB or YUV. In some embodiments, the electronic device 100 may include one or N cameras 193, where N is a positive integer greater than 1.

The digital signal processor is configured to process a digital signal. In addition to processing the digital image signal, the digital signal processor may further process another digital signal. For example, when the electronic device 100 selects a frequency, the digital signal processor is configured to perform Fourier transform or the like on frequency energy.

The video codec is configured to compress or decompress a digital video. The electronic device 100 may support one or more types of video codecs. In this way, the electronic device 100 may play or record videos in a plurality of coding formats, for example, moving picture experts group (moving picture experts group, MPEG)-1, MPEG-2, MPEG-3, and MPEG-4.

The NPU is a neural-network (neural-network, NN) computing processor that processes input information rapidly by referring to a structure of a biological neural network, for example, by referring to a transmission mode between human brain neurons, and can further perform self-learning continuously. The NPU may be used to implement applications such as intelligent cognition of the electronic device 100, for example, image recognition, facial recognition, voice recognition, and text understanding.

The internal memory 121 may include one or more random access memories (random access memory, RAM) and one or more non-volatile memories (non-volatile memory, NVM). In this embodiment of this application, the internal memory 121 may also be referred to as a memory. In some embodiments, a processor (such as a CPU) may create corresponding frame buffers in the memory for rendering processing of different images, and may store the created frame buffer in the memory.

The external memory interface 120 may be configured to connect to an external non-volatile memory, to extend a storage capability of the electronic device 100. The external non-volatile memory communicates with the processor 110 by using the external memory interface 120, to implement a data storage function. For example, files such as music or videos are stored in the external non-volatile memory.

The electronic device 100 may implement an audio function, such as music playing and recording, by using the audio module 170, the speaker 170A, the receiver 170B, the microphone 170C, the headset jack 170D, the application processor, and the like.

The audio module 170 is configured to convert digital audio information into an analog audio signal for output, and is also configured to convert analog audio input into a digital audio signal. The audio module 170 may be further configured to encode and decode audio signals. In some embodiments, the audio module 170 may be disposed in the processor 110, or some function modules of the audio module 170 may be disposed in the processor 110.

The speaker 170A, also referred to as a "horn", is configured to convert an audio electrical signal into a sound signal. The electronic device 100 may be used to listen to music or answer a call in a hands-free mode over the speaker 170A.

The receiver 170B, also referred to as an "earpiece", is configured to convert an audio electrical signal into a sound signal. When a call is answered or audio information is listened to by using the electronic device 100, the receiver 170B may be put close to a human ear to listen to a voice.

The microphone 170C, also referred to as a "mike" or a "mic", is configured to convert a sound signal into an electrical signal. When making a call or sending a voice message, the user may make a sound near the microphone 170C through the mouth, to enter a sound signal to the microphone 170C. At least one microphone 170C may be disposed on the electronic device 100. In some other embodiments, two microphones 170C may be disposed on the electronic device 100. In addition to sound signal collection, a noise reduction function may be further implemented.

The headset jack 170D is configured to connect to a wired headset. The headset jack 170D may be the USB interface 130, or may be a 3.5 mm open mobile terminal 100 platform (open mobile terminal platform, OMTP) standard interface or a cellular telecommunications industry association of the USA (cellular telecommunications industry association of the USA, CTIA) standard interface.

The pressure sensor 180A is configured to sense a pressure signal, and may convert the pressure signal into an electrical signal. In some embodiments, the pressure sensor 180A may be disposed on the display 194.

The gyro sensor 180B may be configured to determine a motion gesture of the electronic device 100.

The barometric pressure sensor 180C is configured to measure barometric pressure. In some embodiments, the electronic device 100 calculates an altitude based on a barometric pressure value measured by the barometric pressure sensor 180C, to assist in positioning and navigation.

The magnetic sensor 180D includes a Hall sensor. The electronic device 100 may detect opening and closing of a flip cover by using the magnetic sensor 180D. In some embodiments, when the electronic device 100 is a flip phone, the electronic device 100 may detect opening and closing of a flip cover based on the magnetic sensor 180D. Further, a feature such as automatic unlocking upon opening of the flip cover is set based on a detected opening or closing state of the flip cover.

The acceleration sensor 180E may detect values of acceleration of the electronic device 100 in all directions (usually on three axes). When the electronic device 100 is static, the acceleration sensor 180E may detect magnitude and a direction of gravity. The acceleration sensor 180E may be further configured to recognize a posture of the electronic device 100, and is applied to an application such as switching between landscape mode and vertical mode and a pedometer.

The distance sensor 180F is configured to measure a distance. The electronic device 100 may measure a distance through infrared or laser. In some embodiments, in a photographing scenario, the electronic device 100 may measure a distance by using the distance sensor 180F, to implement quick focusing.

The optical proximity sensor 180G may include, for example, a light-emitting diode (LED) and a light detector such as a photodiode. The light-emitting diode may be an infrared light-emitting diode. The electronic device 100 emits infrared light by using the light-emitting diode. The electronic device 100 detects infrared reflected light from a nearby object by using the photodiode. When sufficient reflected light is detected, the electronic device 100 may determine that there is an object near the electronic device 100. When insufficient reflected light is detected, the electronic device 100 may determine that there is no object near the electronic device 100. The electronic device 100 may detect, by using the optical proximity sensor 180G, that a user holds the electronic device 100 close to the ear for a call, to automatically turn off a screen to save power. The optical proximity sensor 180G may also be used in a smart cover mode or a pocket mode to automatically perform screen unlocking or locking.

The ambient light sensor 180L is configured to sense ambient light brightness. The electronic device 100 may adaptively adjust brightness of the display 194 based on the sensed ambient light brightness. The ambient light sensor 180L may also be configured to automatically adjust a white balance during photographing. The ambient light sensor 180L may further cooperate with the optical proximity sensor 180G to detect whether the electronic device 100 is in a pocket, to prevent an accidental touch.

The fingerprint sensor 180H is configured to collect a fingerprint. The electronic device 100 may implement fingerprint-based unlocking, application lock access, fingerprint-based photographing, fingerprint-based call answering, or the like based on a feature of the collected fingerprint.

The temperature sensor 180J is configured to detect a temperature. In some embodiments, the electronic device 100 executes a temperature processing policy based on the temperature detected by the temperature sensor 180J. For example, when the temperature reported by the temperature sensor 180J exceeds a threshold, the electronic device 100 reduces performance of a processor near the temperature sensor 180J, to reduce power consumption and implement thermal protection. In some other embodiments, when the temperature is lower than another threshold, the electronic device 100 heats the battery 142 to avoid abnormal shutdown of the electronic device 100 that is caused due to the low temperature. In some other embodiments, when the temperature is lower than still another threshold, the electronic device 100 boosts an output voltage of the battery 142, to avoid an abnormal shutdown caused by a low temperature.

The touch sensor 180K is also referred to as a "touch device". The touch sensor 180K may be disposed on the display 194. The touch sensor 180K and the display 194 form a touchscreen, which is also referred to as a "touch screen". The touch sensor 180K is configured to detect a touch operation performed on or near the touch sensor 180K. The touch sensor may transfer the detected touch operation to the application processor to determine a type of a touch event. Visual output related to the touch operation may be provided by using the display 194. In some other embodiments, the touch sensor 180K may alternatively be disposed on a surface of the electronic device 100 at a position different from that of the display 194.

The bone conduction sensor 180M may obtain a vibration signal. In some embodiments, the bone conduction sensor 180M may obtain a vibration signal of a vibration bone of a human vocal cord part. The bone conduction sensor 180M may also be in contact with a human pulse, and receive a blood pressure beating signal. In some embodiments, the bone conduction sensor 180M may also be disposed in the headset, to form a bone conduction headset. The audio module 170 may obtain a voice signal through parsing based on the vibration signal, of the vibration bone of the vocal cord part, that is obtained by the bone conduction sensor 180M, to implement a voice function. The application processor may parse heart rate information based on the blood pressure beating signal obtained by the bone conduction sensor 180M, to implement a heart rate detection function.

The button 190 includes a power button, a volume button, and the like. The button 190 may be a mechanical button, or may be a touch button. The electronic device 100 may receive button input, and generate button signal input related to user settings and function control of the electronic device 100.

The motor 191 may generate a vibration prompt. The motor 191 may be used for an incoming call vibration prompt, or may be used for touch vibration feedback. For example, touch operations performed on different applications (for example, photo taking and audio playing) may be corresponding to different vibration feedback effects. The motor 191 may also correspond to different vibration feedback effects for touch operations performed in different regions of the display 194. Different application scenarios (for example, a time prompt, information receiving, an alarm clock, and a game) may also be corresponding to different vibration feedback effects. A touch vibration feedback effect may be further customized.

The indicator 192 may be an indicator light, and may be used to indicate a charging status or a power change, or may be used to indicate a message, a missed call, a notification, or the like.

The SIM card interface 195 is configured to connect to a SIM card. The SIM card may be inserted into the SIM card interface 195 or pulled out of the SIM card interface 195, to implement contact with or separation from the electronic device 100. The electronic device 100 may support one or N SIM card interfaces, and N is a positive integer greater than 1. The SIM card interface 195 can support a nano-SIM card, a micro-SIM card, a SIM card, and the like. A plurality of cards may be simultaneously inserted into a same SIM card interface 195. The plurality of cards may be of a same type or different types. The SIM card interface 195 may also be compatible with different types of SIM cards. The SIM card interface 195 may also be compatible with an external memory card. The electronic device 100 interacts with a network by using a SIM card, to implement functions such as conversation and data communication. In some embodiments, the electronic device 100 uses an eSIM, namely, an embedded SIM card. The eSIM card may be embedded in the electronic device 100, and cannot be separated from the electronic device 100.

An embodiment further provides a computer storage medium. The computer storage medium stores computer instructions. When the computer instructions are run on an electronic device 100, the electronic device 100 is enabled to perform the foregoing related method steps to implement the image processing method in the foregoing embodiment.

An embodiment further provides a computer program product. When the computer program product runs on a computer, the computer is enabled to perform the foregoing related steps to implement the image processing method in the foregoing embodiment.

In addition, an embodiment of this application further provides an apparatus. The apparatus may be specifically a chip, a component, or a module. The apparatus may include a processor and a memory that are connected. The memory is configured to store computer executable instructions. When the apparatus runs, the processor may execute the computer executable instructions stored in the memory, so that the chip performs the image processing method in the foregoing method embodiments.

The electronic device, the computer storage medium, the computer program product, or the chip provided in the embodiment is configured to perform the corresponding method provided above. Therefore, for beneficial effects that can be achieved by the electronic device, the computer storage medium, the computer program product, or the chip, refer to beneficial effects in the corresponding method provided above. Details are not described herein again.

It may be clearly learned by a person skilled in the art from the foregoing description of the implementations that, for convenience and brevity of description, division into only the foregoing function modules is used as an example for description. In actual application, the foregoing functions may be allocated to different function modules for implementation according to a requirement, that is, an internal structure of an apparatus is divided into different function modules, to complete all or some of the functions described above.

In the several embodiments provided in this application, it should be understood that the disclosed apparatus and method may be implemented in other manners. For example, the described apparatus embodiments are merely examples. For example, division into the modules or units is merely logical function division. In actual implementation, there may be another division manner. For example, a plurality of units or components may be combined or integrated into another apparatus, or some features may be ignored or not performed. In addition, the displayed or discussed mutual couplings or direct couplings or communication connections may be implemented through some interfaces, and indirect couplings or communication connections between apparatuses or units may be implemented in an electrical, mechanical, or another form.

The units described as separate parts may or may not be physically separate, and parts displayed as units may be one or more physical units, may be located in one place, or may be distributed in a plurality of different places. Some or all of the units may be selected according to an actual requirement to achieve the objectives of the solutions in the embodiments.

In addition, function units in embodiments of this application may be integrated into one processing unit, or each unit may exist alone physically, or two or more units may be integrated into one unit. The integrated unit may be implemented in a form of hardware, or may be implemented in a form of a software function unit.

When the integrated unit is implemented in a form of a software function unit and sold or used as an independent product, the integrated unit may be stored in a readable storage medium. Based on such an understanding, the technical solutions of embodiments of this application essentially, or the part contributing to the conventional technology, or all or some of the technical solutions may be implemented in a form of a software product. The software product is stored in a storage medium and includes several instructions for instructing a device (which may be a single-chip microcomputer, a chip, or the like) or a processor (processor) to perform all or some of the steps of the methods described in embodiments of this application. The foregoing storage medium includes any medium that can store program code, such as a USB flash drive, a removable hard disk, a read-only memory (Read-Only Memory, ROM), a random access memory (Random Access Memory, RAM), a magnetic disk, or an optical disc.

Finally, it should be noted that the foregoing embodiments are merely used to describe the technical solutions of this application, but are not intended to limit this application. Although this application is described in detail with reference to example embodiments, a person of ordinary skill in the art should understand that modification or equivalent replacement may be performed on the technical solutions of this application without departing from the spirit and scope of the technical solutions of this application.

What is claimed is:

1. An image processing method, applied to an electronic device, wherein an application runs on the electronic device, and the method comprises:

receiving a frame buffer resource creation command delivered by an application, wherein a frame buffer resource corresponding to the frame buffer resource creation command comprises a color attachment;

storing, in storage space, one or more primary frame buffer identifiers of one or more primary frame buffers whose quantity of color attachments meets a quantity condition;

receiving a rendering command delivered by the application, wherein the rendering command corresponds to a first frame buffer; and performing a rendering operation corresponding to the rendering command on a second frame buffer if one of the stored primary frame buffer identifiers is consistent with a frame buffer identifier of the first frame buffer, wherein resolution of the second frame buffer is lower than resolution of the first frame buffer.

2. The method according to claim 1, wherein the receiving a frame buffer resource creation command delivered by the application comprises:

receiving a first frame buffer resource creation command delivered by the application, wherein the first frame buffer resource creation command corresponds to a third frame buffer, and a quantity of color attachments of the third frame buffer meets the quantity condition;

the method further comprises: storing a frame buffer identifier of the third frame buffer; and before the receiving a rendering command delivered by the application, the method further comprises:

receiving a second frame buffer resource creation command delivered by the application, wherein the second frame buffer resource creation command corresponds to a fourth frame buffer; and storing a frame buffer identifier of the fourth frame buffer if resolution of the fourth frame buffer is the same as resolution of the third frame buffer.

3. The method according to claim 2, wherein after the receiving the rendering command delivered by the application, the method further comprises:

determining whether one of the stored primary frame buffer identifiers is consistent with the frame buffer identifier of the first frame buffer.

4. The method according to claim 2, wherein before the storing, in storage space, the one or more primary frame buffer identifiers, the method further comprises:

determining whether a quantity of color attachments of the frame buffer resource corresponding to the frame buffer resource creation command meets the quantity condition.

5. The method according to claim 1, wherein before the performing the rendering operation corresponding to the rendering command on the second frame buffer, the method further comprises:

replacing the first frame buffer with the second frame buffer.

6. The method according to claim 2, wherein before the storing the frame buffer identifier of the fourth frame buffer if resolution of the fourth frame buffer is the same as resolution of the third frame buffer, the method further comprises:

obtaining the resolution of the third frame buffer and the resolution of the fourth frame buffer.

7. The method according to claim 1, wherein after the receiving the frame buffer resource creation command delivered by the application, the method further comprises:

determining the quantity of color attachments of the frame buffer resource corresponding to the frame buffer resource creation command.

8. The method according to claim 1, wherein the electronic device comprises a processor and an internal memory, and the method further comprises:

receiving, by the processor, the frame buffer resource creation command delivered by the application, wherein the frame buffer resource corresponding to the frame buffer resource creation command comprises the color attachment;

sending, by the processor, one of the one or more frame buffer identifiers of one of the one or more primary frame buffers whose quantity of color attachments meets the quantity condition to the internal memory; and storing, by the internal memory, the frame buffer identifier sent by the processor.

9. The method according to claim 8, wherein the receiving, by the processor, the frame buffer resource creation command delivered by the application comprises:

receiving, by the processor, the first frame buffer resource creation command delivered by the application, wherein the first frame buffer resource creation command corresponds to the third frame buffer, and the quantity of color attachments of the third frame buffer meets the quantity condition;

the method further comprises: storing, by the internal memory, the frame buffer identifier of the third frame buffer; and before the receiving the rendering command delivered by the application, the method further comprises:

receiving, by the processor, the second frame buffer resource creation command delivered by the application, wherein the second frame buffer resource creation command corresponds to the fourth frame buffer; and sending, by the processor, the frame buffer identifier of the fourth frame buffer to the internal memory if resolution of the fourth frame buffer is the same as resolution of the third frame buffer.

10. The method according to claim 9, wherein after the receiving the rendering command delivered by the application, the method further comprises:

obtaining, by the processor, the stored frame buffer identifier from the internal memory.

11. The method according to claim 10, wherein after the receiving the rendering command delivered by the application, the method further comprises:

determining, by the processor, whether the frame buffer identifier consistent with the frame buffer identifier of the first frame buffer exists in the stored frame buffer identifier.

12. The method according to claim 9, wherein the electronic device comprises a graphics processing unit, and the method further comprises:

sending, by the processor, the frame buffer resource creation command to the graphics processing unit, wherein the frame buffer resource creation command is used to instruct the graphics processing unit to create the frame buffer resource corresponding to the frame buffer resource creation command.

13. The method according to claim 12, wherein the performing the rendering operation corresponding to the rendering command on the second frame buffer comprises:

replacing, by the processor, the first frame buffer in the rendering command with the second frame buffer;

sending, by the processor, the rendering command to the graphics processing unit; and performing, by the graphics processing unit, the rendering operation corresponding to the rendering command on the second frame buffer.

14. The method according to claim 8, wherein the processor comprises an interception module and a recognition module, and the receiving, by the processor, the frame buffer resource creation command delivered by the application comprises:

intercepting, by the interception module, the frame buffer resource creation command delivered by the application, and sending the frame buffer resource creation command to the recognition module; and receiving, by the recognition module, the frame buffer resource creation command.

15. The method according to claim 14, wherein the receiving, by the recognition module, the frame buffer resource creation command comprises:

receiving, by the recognition module, the first frame buffer resource creation command, wherein the first frame buffer resource creation command corresponds to the third frame buffer, and the quantity of color attachments of the third frame buffer meets the quantity condition;

the method further comprises: storing, by the internal memory, the frame buffer identifier of the third frame buffer; and before the receiving the rendering command delivered by the application, the method further comprises:

receiving, by the recognition module, the second frame buffer resource creation command, wherein the second frame buffer resource creation command corresponds to the fourth frame buffer; and sending, by the recognition module, the frame buffer identifier of the fourth frame buffer to the internal memory if resolution of the fourth frame buffer is the same as resolution of the third frame buffer.

16. The method according to claim 10, wherein the processor comprises a decision module, and after the obtaining, by the processor, the stored frame buffer identifier from the internal memory, the method further comprises:

determining, by the decision module, whether the frame buffer identifier consistent with the frame buffer identifier of the first frame buffer exists in the stored frame buffer identifier.

17. The method according to claim 12, wherein the processor comprises a replacement module, and before the replacing, by the processor, the first frame buffer in the rendering command with the second frame buffer, the method further comprises:

sending, by the decision module, the rendering command to the replacement module if the frame buffer identifier consistent with the frame buffer identifier of the first frame buffer exists in the storage space;

the replacing, by the processor, the first frame buffer in the rendering command with the second frame buffer comprises:

replacing, by the replacement module, the first frame buffer corresponding to the rendering command with the second frame buffer; and the sending, by the processor, the rendering command to a graphics processing unit comprises:

sending, by the replacement module, the rendering command to the graphics processing unit.

18. An electronic device, wherein the electronic device comprises a memory and a processor;

the memory is configured to store program instructions; and the processor is configured to read the program instructions stored in the memory, to:

receive a frame buffer resource creation command delivered by an application, wherein a frame buffer resource corresponding to the frame buffer resource creation command comprises a color attachment;

store, in storage space, one or more primary frame buffer identifiers of one or more primary frame buffers whose quantity of color attachments meets a quantity condition;

receive a rendering command delivered by the application, wherein the rendering command corresponds to a first frame buffer; and perform a rendering operation corresponding to the rendering command on a second frame buffer if one of the stored primary frame buffer identifiers is consistent with a frame buffer identifier of the first frame buffer, wherein resolution of the second frame buffer is lower than resolution of the first frame buffer.

19. A non-transitory computer-readable storage medium, wherein the computer-readable storage medium stores computer-readable instructions, and when the computer-readable instructions are executed by a processor, causing the computer to:

receive a frame buffer resource creation command delivered by an application, wherein a frame buffer resource corresponding to the frame buffer resource creation command comprises a color attachment;

store, in storage space, one or more primary frame buffer identifiers of one or more primary frame buffers whose quantity of color attachments meets a quantity condition;

receive a rendering command delivered by the application, wherein the rendering command corresponds to a first frame buffer; and perform a rendering operation corresponding to the rendering command on a second frame buffer if one of the stored primary frame buffer identifiers is consistent with a frame buffer identifier of the first frame buffer, wherein resolution of the second frame buffer is lower than resolution of the first frame buffer.

* * * * *